(12) United States Patent
Masuda et al.

(10) Patent No.: US 6,914,661 B2
(45) Date of Patent: Jul. 5, 2005

(54) CELL GAP ADJUSTING DEVICE, PRESSURIZING SEAL DEVICE AND LIQUID CRYSTAL DISPLAY DEVICE MANUFACTURING METHOD

(75) Inventors: Kenji Masuda, Hata machi (JP); Masahiro Kuroiwa, Nagano (JP)

(73) Assignee: Seiko Epson Corporation (JP)

( * ) Notice: Subject to any disclaimer, the term of this patent is extended or adjusted under 35 U.S.C. 154(b) by 197 days.

(21) Appl. No.: 09/947,946

(22) Filed: Sep. 6, 2001

(65) Prior Publication Data

US 2002/0044253 A1 Apr. 18, 2002

(30) Foreign Application Priority Data

| Sep. 7, 2000 | (JP) | 2000-271565 |
| Sep. 19, 2000 | (JP) | 2000-284167 |
| Jul. 12, 2001 | (JP) | 2001-212081 |

(51) Int. Cl.$^7$ .................. G02F 1/1339; G02F 1/1341
(52) U.S. Cl. .................. 349/190; 349/153; 349/154; 349/187; 349/192
(58) Field of Search ................ 349/189, 190, 349/192, 187, 153, 154

(56) References Cited

U.S. PATENT DOCUMENTS

| 5,492,582 | A | * | 2/1996 | Ide et al. ............... 156/106 |
| 5,499,127 | A | | 3/1996 | Tsubota et al. |
| 6,005,653 | A | * | 12/1999 | Matsuzawa ............. 349/154 |
| 6,118,509 | A | * | 9/2000 | Miyake .................. 349/153 |
| 6,211,938 | B1 | * | 4/2001 | Mori ..................... 349/190 |
| 6,618,156 | B2 | * | 9/2003 | Kuroiwa ................ 356/630 |

FOREIGN PATENT DOCUMENTS

| JP | 03-52720 U | 3/1991 |
| JP | 04-311927 | 4/1992 |
| JP | 05-018859 | 1/1993 |
| JP | 09-113865 | 5/1997 |
| JP | 10-254389 | 9/1998 |
| JP | 11-119234 | 4/1999 |
| JP | 11-201732 | 7/1999 |
| JP | 2992968 | 10/1999 |
| JP | 2000-002864 | 1/2000 |
| JP | 2000-010102 | 1/2000 |
| JP | 2000-089238 | 3/2000 |
| JP | 2000-235189 | 8/2000 |
| JP | 2000-294896 | 10/2000 |

OTHER PUBLICATIONS

Examination results from corresponding Japanese application No. 2001-212081, no translation.
Communication from Taiwan Patent Office re counterpart application, no translation.

* cited by examiner

*Primary Examiner*—Andrew Schechter
(74) *Attorney, Agent, or Firm*—Harness, Dickey & Pierce, P.L.C.

(57) ABSTRACT

A cell gap adjusting device 2 for adjusting a thickness between a pair of substrate plates (cell gap) in a liquid crystal cell 1 having a liquid crystal filled between the pair of substrate plates bonded together through a seal member having a frame form and an opening in a predetermined point of a frame wall thereof, the cell gap adjusting device characterized by comprising: a supporting part 3 having one or more pairs of supporting jigs 30 (301a, 301b, 302a–302e) for clamping to support one or more of the liquid crystal cells 1 and closing seals 32 in a frame form arranged between the liquid crystal cell 1 and the supporting jigs 30 (301a, 301b, 302a–302e) to form an enclosed space by both outer surfaces of the pair of substrate plates of the liquid crystal cell 1, opposed surfaces of the one pair of support jigs 30 (301a, 301b, 302a–302e) to the liquid crystal cell 1 and an inner surface thereof (of the closing seal); and a pressurizing part 50 for simultaneously pressurizing both outer surfaces of the one pair of substrate plates of the liquid crystal cell 1 by the pressure of a fluid introduced in the enclosed space.

21 Claims, 10 Drawing Sheets

(a)

(b)

CELL GAP ADJUSTING DEVICE, PRESSURIZING SEAL DEVICE AND LIQUID CRYSTAL DISPLAY DEVICE MANUFACTURING METHOD

BACKGROUND OF THE INVENTION

1. Technical Field to Which the Invention Belongs

The present invention relates to a cell gap adjusting device, pressurizing seal device and liquid crystal display device manufacturing method for adjusting a thickness between a pair of substrate plates (hereinafter, referred to as "cell gap") in a liquid crystal cell.

2. Prior Art

It is a general practice to manufacture a conventionally widespread liquid crystal device by bonding together an opposing pair of substrate plates through a seal member having a frame form and an opening at a predetermined point in a frame wall thereof into a cell, filling a liquid crystal into the cell through the opening in the seal member, and sealing the opening with a seal material. Herein, the method for filling a liquid crystal into the cell broadly uses a so-called vacuum filling method. That is, a chamber having cells arranged is evacuated into a vacuum state, so that, if the atmospheric pressure is restored within the chamber with the opening in the cell seal member immersed in liquid crystal, a pressure difference occurs between the cell and the chamber. As a result, liquid crystal is filled within the cell.

However, where using the above method, liquid crystal may be excessively filled in the cell possibly resulting in a case where the cell gap of the liquid crystal cell is greater than a predetermined thickness (hereinafter, referred to as "target value"). Namely, the substrate plates in the pair are possibly swelled outward (oppositely to the liquid crystal). There has been a problem that an expected display characteristic cannot be obtained in a liquid crystal device using a liquid crystal cell thus increased in cell gap greater than a target value. In order to solve such a problem, it is a general practice to carry out a so-called pressurizing process at a stage where the liquid crystal has been poured but the opening of the seal member is not yet sealed wherein pressure is exerted onto both outer surfaces of the substrate of liquid crystal cell thereby expelling excessive liquid crystal and adjusting the cell gap to a target value.

Herein, FIG. 13 is a sectional view showing one example of a conventional pressurizing device as used in such a pressurizing process. As shown in FIG. 13, conventionally it is a general practice to clamp a liquid crystal cell 1 to be pressurized by a pair of rigid plate-like members 90 and apply a force F to the plate-like members 90 thereby exerting pressure onto the substrate plates 11, 12 of the liquid crystal cell 1.

FIG. 14 is a sectional view showing another example of a conventional pressurizing device. It is noted that this figure shows a case wherein a plurality of liquid crystal cells 1 are to be worked at one time.

As shown in FIG. 14, in the conventional pressurizing device, liquid crystal cells 1 to be worked and interposing papers 91 for impact absorption and protecting the substrate surfaces of the liquid crystal cells 1 are alternately stacked one over another, and these are clamped by rigid plate-like members 90. Then, pressure is exerted onto the plate-like members 90 thereby pressing the substrate plates of each liquid crystal cell 1 at both outer surfaces through the interposing papers 91 thus providing pressurization.

However, the pressurizing device shown in FIG. 13 is structured such that the plate-like members 90 are in direct contact with the substrate surfaces of the liquid crystal cell 1. Consequently, in order to correctly adjust a cell gap in the liquid crystal cell 1, there is a need to make the contact surface a perfect flat surface. However, there is a limit in making the surface of the plate-like member 90 such a perfect flat surface. Currently, some roughness is formed in the surface or the plate-like members 90 are unavoidably uneven in thickness. Thus, there has been a problem that, if the liquid crystal cell 1 is directly pressurized by such imperfect surfaces and the cell gap is not correctly adjusted to a target value, an expected display characteristic is not obtained in the completed liquid crystal device.

Meanwhile, because the pressurizing device shown in FIG. 14 is structured such that the interposing papers 91 are in direct contact with the substrate surfaces of the liquid crystal cells 1, pressure cannot be evenly exerted onto the substrate surfaces of the liquid crystal cells 1 similarly to the pressurizing device shown in FIG. 13. There has been a problem that an expected display characteristic cannot be obtained in the completed liquid crystal device.

Also, in a duration of from starting the pressurizing on the plate-like members 90 to a full contraction of the interposing papers 91, because the pressure on the plate-like members 90 is absorbed by the interposing papers 91, a pressure as expected cannot be exerted onto the substrate surfaces of the liquid crystal cells 1. As a result, there has been a problem that the time the cell gap in the liquid crystal cell 1 reaches a target value is prolonged by an amount of the foregoing period. Furthermore, where the number of liquid crystal cells 1 to be simultaneously worked is increased in order to improve productivity, the number of the interposing papers 91 inserted between the liquid crystal cells is also increased. Thus, the above problem is particularly pronounced.

The present invention has been made in view of the foregoing problems, and it is an object to provide a cell gap adjusting device, pressurizing seal device and liquid crystal display device manufacturing method capable of correctly and swiftly adjusting the cell gap of one or more liquid crystal cells.

SUMMARY OF THE INVENTION

In order to solve the above problem, a cell gap adjusting device of the present invention is a cell gap adjusting device for adjusting a thickness between a pair of substrate plates (cell gap) in a liquid crystal cell having a liquid crystal filled between the pair of substrate plates bonded together through a seal member having a frame form and an opening in a predetermined point of a frame wall thereof, the cell gap adjusting device characterized by comprising: supporting means having one or more pairs of supporting jigs for clamping to support one or more of the liquid crystal cells and closing seals in a frame form arranged between the liquid crystal cell and the supporting jigs to form an enclosed space by both outer surfaces of the pair of substrate plates of the liquid crystal cell, opposed surfaces of the one pair of support jigs to the liquid crystal cell and an inner surface thereof (of the closing seal); and pressurizing means for simultaneously pressurizing both outer surfaces of the one pair of substrate plates of the liquid crystal cell by a pressure of a fluid introduced in the enclosed space.

According to the cell gap adjusting device, one pair of substrate plates of a liquid crystal cell at both outer surfaces can be pressed by a pressure of a fluid introduced in the enclosed space. Accordingly, the cell gap can be correctly adjusted as compared to the conventional method that places the pressurizing members in direct contact with both outer surfaces of one pair of substrate plates to press both outer surfaces of the one pair of substrate plates.

Also, as in the foregoing, in the case of the conventional pressurizing method that pressurizing is made by alternately stacking liquid crystal cells and interposing papers, it is impossible to exert a desired pressure onto both outer surfaces of the substrate plates of the liquid crystal cell in a duration of from starting pressurizing to a full contraction of the interposing papers, correspondingly requiring a long time for the cell gap to reach a target value. According to the cell gap adjusting device of the invention, a fluid pressure can be swiftly exerted to both outer surfaces of the substrate plates, thereby adjusting the cell gap in a brief time.

Incidentally, the liquid crystal cell may be a liquid crystal cell group structured by filling a liquid crystal in a plurality of cells formed by bonding the one pair of substrate plates through a plurality of seal members in frame form in plane without overlapping with one another. That is, the liquid crystal cell to be worked by the cell gap adjusting device of the invention includes, besides (a) "a liquid crystal cell that one pair of substrate plates are bonded together through one seal member to fill a liquid crystal between the one pair of substrate plate", (b) "liquid crystal cells that one pair of substrate plates are bonded together through a plurality of seal members to fill a liquid crystal in a plurality of regions surrounded by both outer surfaces of the substrate plates and each seal member", i.e. one arrayed with the plurality of liquid crystal cells of the above (a) (a liquid crystal cell group).

A cell gap adjusting device of the invention may further comprise control means for detecting a cell gap of one or more liquid crystal cells (detection cell) specified as a cell gap detecting cell, calculating a pressure for pressurizing both outer surfaces of the pair of substrate plates of the liquid crystal cell on the basis of a detected cell gap, and instructing and delivering a signal concerning the pressure to the pressurizing means. This structure makes it possible to adjust the pressure to be exerted on the both outer surfaces of the substrate plates of the liquid crystal cell in accordance with a situation of a cell gap of the liquid crystal cell to be worked, thereby adjusting the cell gap more correctly. Incidentally, as in the foregoing, the "detection cell"means a liquid crystal cell on which a cell gap is to be detected among one or more liquid crystal cells to be worked by the cell gap adjusting device of the invention.

Meanwhile, it is preferred that a cell gap adjusting device further comprise a light source arranged in a surface opposite to a surface opposed to the detection cell of one detecting support jig of one pair of support jigs clamping to support the detection cell, the control means having a light detecting section arranged outward of a side of the other detecting support jig to detect a transmission light emitted from the light source and passed through the detection cell, a cell gap detecting section for detecting a cell gap on the basis of a result of detection by the light detecting section, and a pressure instructing section for comparing between a detected cell gap and a target value to instruct and deliver to the pressurizing means a signal concerning a pressure for pressurizing both outer surfaces of the pair of substrate plates of the liquid crystal cell calculated on the basis of a result of comparison.

In the case of pressing with the pressing members directly contacted with both outer surfaces of the substrate plates as in the conventional method, the correct adjustment of a cell gap to a desired thickness requires an extremely high degree of flatness in a contact surface of the same member with the liquid crystal cell. Accordingly, the material used in forming the same member is restricted to those meeting such a requirement. Contrary to this, the cell gap adjusting device of the invention structured as the above, because of no need of direct contact of a member with the both outer surfaces of the substrate plate, does not undergo such a restriction in respect of a material of the pressing member. The material of the pressing member (support jigs, etc.) can be arbitrarily selected. As a result, the cell gap adjusting device of the invention can easily realize a structure of passing through a liquid crystal cell (detection cell) the light emitted from a light source in order to detect a cell gap, e.g. structure forming the support jig of a material having a light transmissive property.

Incidentally, the method of determining a cell gap on the basis of a result of detection by the light detecting section may include, for example, a method of detecting a cell gap on the basis of a chromaticity coordinate of the transmission light detected by the light detecting section and a method of detecting a cell gap on the basis of a spectral characteristic of the transmission light detected by the light detecting section. According to the latter method, even where the liquid crystal cell has a color filter or the like, a cell gap can be correctly detected without being effected by the color filter characteristic. Incidentally, this method is realized, for example, by detecting such a wavelength of a transmission light that the transmissivity of the transmission light is a minimum value or maximum value and detecting a cell gap through a predetermined operation using that wavelength.

Herein, it is possible to consider, as a form of supporting one or more liquid crystal cells by one or more pairs of support jigs, a form of supporting one or more liquid crystal cells arrayed on one plane by one or more pairs of support jigs. However, it is preferred to provide a form that the one pair or more support jigs are structured by one pair or more plate-like members stacked on one another with spacing, to clamp and support the liquid crystal cells between the one pair or more plate-like members. This structure can arrange the cell gap adjusting device in a narrower space, as compared to the case of arraying one or more liquid crystal cells on one plane. Incidentally, where adopting such a structure, it is preferred to provide a liquid crystal cell fixing pressurizing member structured by an elastic member in a bag form arranged between mutually opposed outer surfaces of the plate-like members directly adjacent without interposing a liquid crystal cell between them among the one pair or more of plate-like members to enable a fluid to be supplied to an interior thereof (of the liquid crystal cell fixing pressurizing member), to enable pressurizing the mutually opposed outer surfaces of the adjacent plate-like members by a pressure of a fluid supplied. By adjusting the fluid supplied to the interior of the liquid crystal cell fixing pressurizing member, it is possible to facilitate the liquid crystal cells to be attached to and detached from the support members.

Incidentally, where supporting one or more liquid crystal cells in a stacked state in this manner, it is preferred that the detection cell (that is, liquid crystal cell on which a cell gap is to be detected) is a liquid crystal cell clamped and supported by one pair of the plate-like members positioned at ends among one or more pairs of the plate-like members stacked on one another with spacing among one or more liquid crystal cells. This structure makes it possible to position the other liquid crystal cell only on one side. Accordingly, on the opposite side the device for detecting a cell gap on a detection cell can be easily arranged.

Also, it is preferred that the closing seal has a portion overlapped with the seal material as viewed in a direction nearly vertical to the surfaces of the one pair of substrate plates.

Where curing a seal material (e.g. those having a property of ultraviolet cure) applied to the opening of the seal member in a liquid crystal cell and drawn between one pair of substrate plates, illuminating an ultraviolet ray in a vertical direction to the substrate plate requires shorter time in curing the seal material than illuminating an ultraviolet ray in a parallel direction with the substrate plate. In the case of illuminating an ultraviolet ray in a direction vertical to the substrate plates, if the distance is excessively close to an edge of the substrate plate of the liquid crystal cell in a vicinity of the opening of the seal member to the closing seal, the ultraviolet ray is shaded by the closing seal. As a result, there is a case that a sufficient ultraviolet ray cannot be illuminated to the seal material. In view of such a circumstance, it is preferred that a distance from an edge of the substrate plate of the liquid crystal cell in a vicinity of an opening of the seal material to the closing seal is 1 mm or greater. This structure makes it possible to illuminate a sufficient ultraviolet ray to the seal material thereby improving the certainty of curing.

Herein, it is to be assumed that the above distance cannot reliably be made 1 mm or greater. In this case, it is preferred that the closing seal in a part in the vicinity of the opening of the seal member has a recess form recessed in a direction away from the opening. In other words, it is preferred that the form of the closing seal in a part in the vicinity of the opening of the seal member is a form not overlapped with the seal material drawn between the one pair of substrate plates as viewed in a vertical direction with respect to the substrate plate surface, i.e. a form avoiding a region where the seal material is drawn. This structure allows a sufficient ultraviolet ray to be illuminated to the seal material without shading of the ultraviolet ray by the closing seal.

Herein, in the foregoing cell gap adjusting device, it is preferred that an enclosed space is formed by opposed surfaces of the one pair of support jigs to the liquid crystal cell, an inner surface of the closing seal and one region of both outer surfaces of the substrate plates of the liquid crystal cell surrounded by the closing seal. This structure can work a plurality of kinds of liquid crystal cells mutually different in substrate surface size by the use of one kind of closing seal. That is, it is preferred that the one or more pairs of support jigs can support the one or more liquid crystal cells mutually different in substrate plate size and the closing seal is structured in contact with both outer surfaces of the substrate plates structuring all the liquid crystal cells supported by the one or more pairs of support jigs. In this case, in order to ensure that a pressure to be exerted on both outer surfaces of the substrate plates is a sufficient pressure for expelling an extra liquid crystal in the liquid crystal cell, it is preferred that the one region of both substrate plate outer surfaces of the liquid crystal cell surrounded by the closing seal has an area of one-third or greater of an area of both substrate plate outer surfaces.

Meanwhile, in order to solve the foregoing problem, a pressurizing seal device of the invention comprises: the above cell gap adjusting device, seal material applying means for applying a seal material to a vicinity of the opening of the seal member of one or more of the liquid crystal cells in a stage where the cell gap of the detection cell is adjusted to be nearly the same as a target value by the cell gap adjusting device, and seal material hardening means for hardening at least one part of the seal material drawn between the pair of substrate plates of one or more of the liquid crystal cells and proceeding to harden the seal material in a direction nearly vertical to the substrate plate surface of the liquid crystal cell.

This structure makes it possible to cure the seal material in a direction nearly vertical to the substrate plate surface of the liquid crystal cell. Accordingly, as compared to the curing the seal material in a direction parallel with the substrate plate of the liquid crystal cell, the seal material drawn between the one pair of substrate plates can be cured in a brief time.

Specifically, it is preferred that the seal material has a light-cure property, and the seal material hardening means illuminating light to the seal material in a direction nearly vertical to the substrate plate surface of one or more of the liquid crystal cells.

Meanwhile, in order to solve the foregoing problem, a manufacturing method for a liquid crystal display device of the invention is a manufacturing method for a liquid crystal display device having a liquid crystal filling process of filling a liquid crystal between one pair of substrate plates bonded together through a seal member having a frame form and an opening in a predetermined point of a frame wall thereof thereby forming a liquid crystal cell, a cell gap adjusting process of adjusting a cell gap of the liquid crystal cell, and a seal process of sealing the opening in the seal member when the cell gap of the liquid crystal cell becomes nearly the same as a target value, wherein the cell gap adjusting process includes clamping to support one or more of the liquid crystal cells by one or more pairs of support jigs, the manufacturing method for a liquid crystal display device characterized by including: a process of forming an enclosed space by an inner surface of a closing seal provided between the liquid crystal cell and the support jig, both outer surfaces of one pair of substrate plates of the liquid crystal cell and opposed surfaces of the one pair of support jigs to the liquid crystal cell; and a pressurizing process of introducing a fluid into the enclosed space and simultaneously pressurizing both outer surfaces of the one pair of substrate plates of the liquid crystal cell by the pressure of an introduced fluid.

This structure makes it possible to indirectly press both outer surfaces of the substrate plates of the liquid crystal cell due to the pressure of a fluid supplied in the enclosed space without contact of the pressurization member directly with both outer surfaces of the substrate plates. Accordingly, as compared to the conventional method, the cell gap can be adjusted correctly and swiftly. Therefore, according to this manufacturing method, it is possible to efficiently manufacture liquid crystal display devices with less display-quality variation.

In this case, it is preferred that the cell gap adjusting process includes detection of a cell gap of one or more liquid crystal cells (detection cell) specified as a cell gap detecting cell from among one or more of the liquid crystal cells, calculating a pressure to pressurize both outer surfaces of the one pair of substrate plates of the liquid crystal cell on the basis of a detected cell gap, and instructing and delivering a signal concerning the pressure to the pressurizing means.

This structure makes it possible to adjust the pressure to be exerted to both outer surfaces of the substrate plates of the liquid crystal cell in accordance with a current situation of the cell gap in the liquid crystal cell to be worked. Accordingly, the cell gap can be adjusted more accurately.

DETAILED DESCRIPTION OF THE PREFERRED EMBODIMENTS

Figure 1:
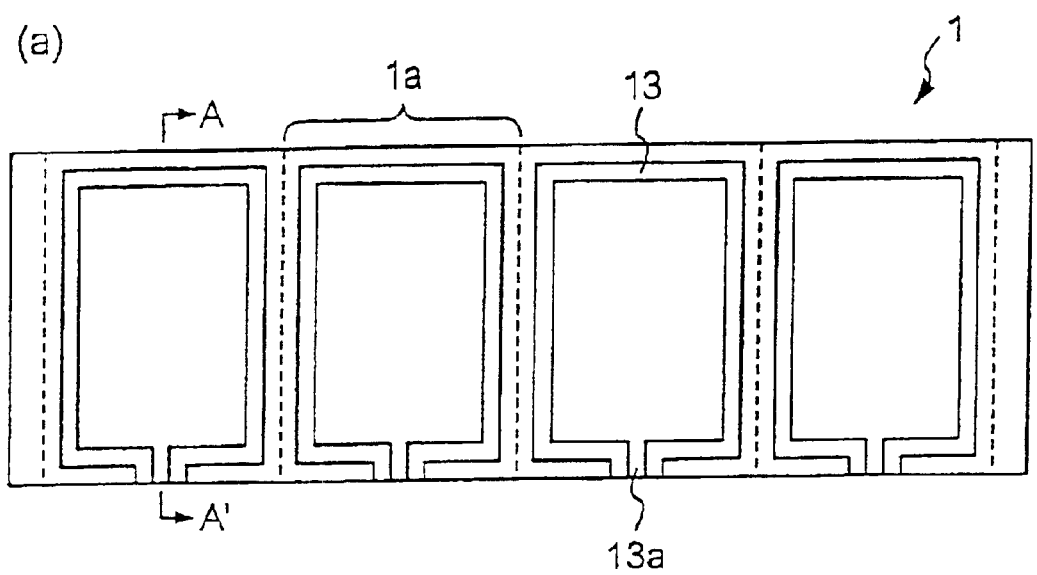
FIG. 1 is an explanatory view showing one example of a structure of a liquid crystal cell group to be worked in a cell gap adjusting device of the present invention, wherein (a) is a plan view and (b) is a sectional view on line A–A' in (a).
Figure 1:
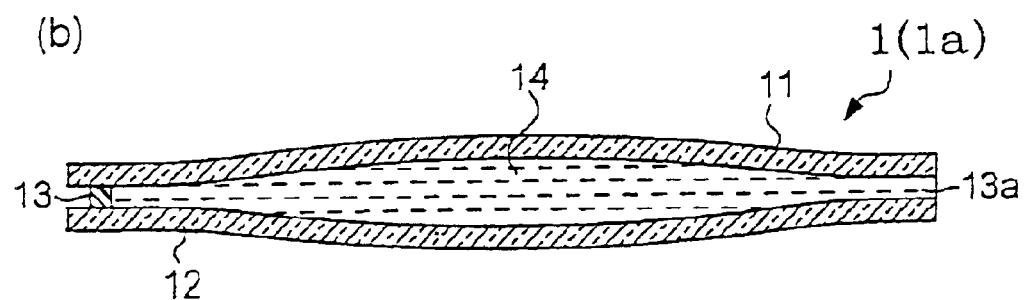

Hereunder, embodiments of the present invention will be explained with reference to the drawings. The embodiments represent one form of the invention and are not limitative of the invention and can be arbitrarily modified within the range of the invention.

A; Embodiment Structure (1) Liquid Crystal Cell (Group) Structure

First, prior to explaining a structure of a cell gap adjusting device of the present embodiment, explanation is made on the structure of liquid crystal cells (liquid crystal cell group) to be worked by the device.

FIG. 1(a) is a plan view showing one example of a structure of the liquid crystal cell group 1, and FIG. 1(b) is a sectional view as viewed on line A–A' in FIG. 1(a). As shown in the figures, the present embodiment explains a case that to be worked is a liquid crystal cell group 1 in a structure arrayed with four liquid crystal cells 1a. That is, first, as shown in FIGS. 1(a) and (b), a pair of substrate plates 11, 12 mutually opposed are bonded together through a seal member 13 having a frame form in an area corresponding to each liquid crystal cell 1a and an opening 13a in a frame wall thereof in plane without overlapping with one another, thereby forming four cells. Then, a liquid crystal 14 is vacuum poured into each cell, i.e. a region surrounded by the pair of substrates 11, 12 and the seal member 13, through the opening 13a. This forms a liquid crystal cell group 1 having a structure arrayed with four liquid crystal cells 1a. The liquid crystal cell group 1 thus structured, after worked by a cell gap adjusting device of the invention, is divided along the broken lines shown in FIG. 1(a) into individual liquid crystal cells 1a. It is noted that, although actually the electrodes, interconnections, orientation films and the like for driving a liquid crystal 14 are properly formed for every liquid crystal cell 1a on the inner surfaces (at a liquid crystal 14 side) of the substrate plates 11, 12, these are not related to the invention and hence omitted from illustration and explanation.

In the case of using the foregoing vacuum pouring method as a method for pouring a liquid crystal 14, the liquid crystal 14 is excessively poured in each cell. As shown in FIG. 1(b), the substrate plates 11, 12 of each liquid crystal cell 1a are in a form convexly swelled toward the outer side (i.e. toward the side opposite to the liquid crystal 14) thereby increasing the cell gap (d) greater than a target value (d0).

The cell gap adjusting device of the embodiment is a device for carrying out a so-called pressure sealing process that causes a liquid crystal 14 thus excessively poured to flow out of the liquid crystal cell 1a to adjust the cell gap (d) to a target value (d0) and seal an opening 13a of a seal member 13 by the use of a seal material. Accordingly, to be worked by the cell gap adjusting device in the embodiment is a liquid crystal cell (liquid crystal cell group) 1 which is in a stage where liquid crystal 14 has been poured in each cell but the opening 13a of the seal member 13 is not yet sealed with a seal material.

(2) Cell Gap Adjusting Device Structure

Figure 2:
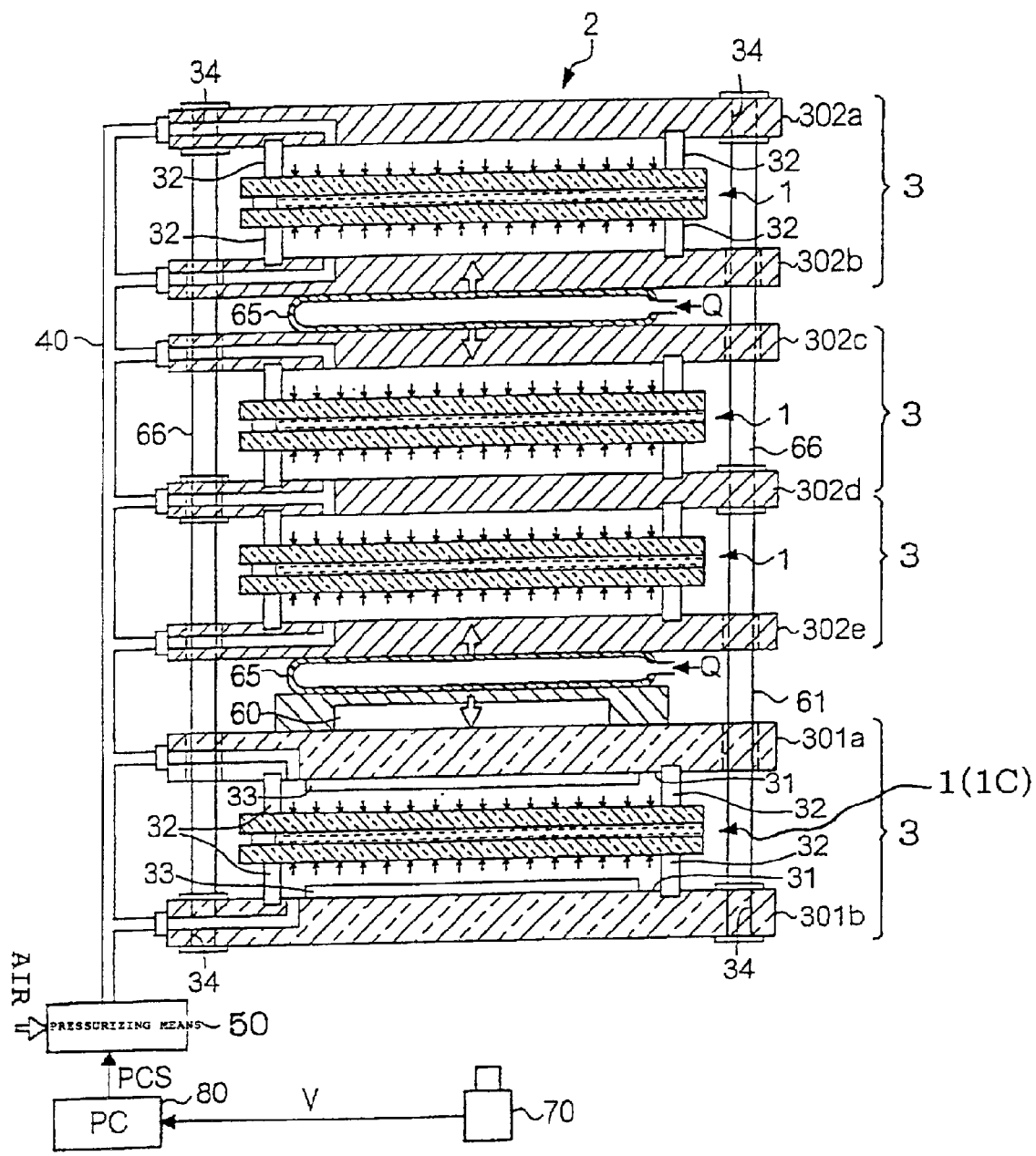
FIG. 2 is a sectional view showing one embodiment of a cell gap adjusting device of the invention.

Next, explanation is made on the structure of the cell gap adjusting device 2 of the embodiment with reference to FIG. 2. As shown in FIG. 2, the cell gap adjusting device 2 is structured including support means 3 having a support jig (a pair of transparent support jigs 301a, 301b, five opaque support jigs 302a–302e) and closing seal 32 hereinafter described, a fluid supply pipe 40, pressurizing means 50, a light source 60, a liquid-crystal-cell-fixing pressurizing member 65, a color CCD (Charge Coupled Device) camera 70 and a personal computer (corresponding to the foregoing "control means", hereinafter referred to as "PC") 80. With this structure, the cell gap adjusting device 2 can support four liquid crystal cell groups 1 (each structured with four liquid crystal cells 1a, as in the foregoing), to work them simultaneously. It is noted, hereinafter, where there is no need to specify any of the transparent support jigs 301a and 301b and the opaque support jigs 302a–302e, they are referred merely to as "support jig 30" (see FIG. 6). Meanwhile, although FIG. 2 shows the case of supporting four liquid crystal cell groups 1, the number of supported liquid crystal cell groups 1 is not limited to four and application is similar for one-or-more cases (i.e. the cases supported by a pair or more of support jigs).

Figure 3:
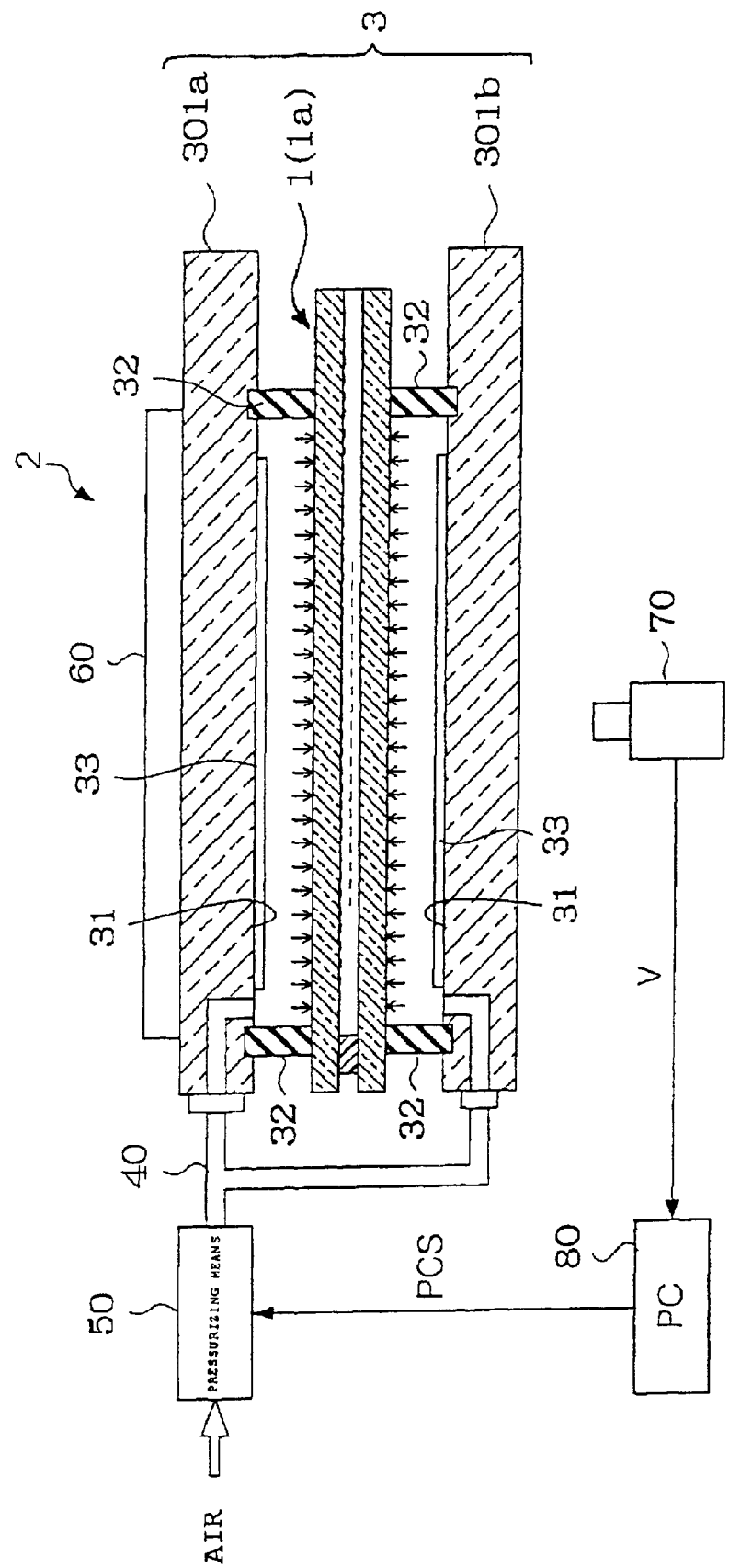
FIG. 3 is a sectional view showing another embodiment of a cell gap adjusting device of the invention.

FIG. 3 shows another embodiment of a cell gap adjusting device of the invention in the case where one liquid crystal cell group 1 is supported by a pair of support jigs. The device thus structured sequentially deals with liquid crystal cell groups 1 and hence is well suited where the cell gap adjusting device 2 is built in an automated line. It is noted that the reference numerals on the structural elements in FIG. 3 use the similar reference numerals as the case in FIG. 2.

As shown in FIG. 2, the support jig 30 structuring the support means 3 is a plate member generally in a rectangular form, which has two through holes 34 in the vicinity of the edges. As shown in FIG. 2, two shafts 66 are inserted through the through holes 34 of each support jig 30. This places the plurality of support jigs 30 in a structure stacked on one another adjacent support jig 30 with spacing. In such a structure, the liquid crystal cell group 1 to be worked is clamped and supported between the adjacent support jigs 30 (in pair) (specifically, between the transparent supporting jigs 301a and 301b, between the opaque support jigs 302a and 302b, between the opaque support jigs 302c and 302d and between the opaque support jigs 302d and 302e).

Herein, the transparent support jigs 301b and the opaque support jigs 302a and 302d are fixed by the shafts 66. On the other hand, the transparent support jig 301a and the opaque support jigs 302b, 302c and 302e are movable relative to the shafts 66. Liquid-crystal-cell-fixing pressurizing members 65 are disposed between the opaque support jigs 302b and 302c as well as between the opaque support jig 302e and the transparent support jig 301a. The liquid-crystal-cell-fixing pressurizing member 65, e.g. a bag-formed member formed of an elastic material such as rubber, is made to pressurize the support jigs 30 positioned above and below the liquid-crystal-cell-fixing pressurizing member 65 by a pressure Q of fluid supplied into the member (In FIG. 2, the direction of pressurizing is shown at open arrows). In such a structure, in a state the liquid-crystal-cell-fixing pressurizing member 65 presses the support jigs 30, the liquid crystal cell group 1 placed between the support jigs 30 is fixed. On the other hand, when the pressing of the support jigs 30 by the liquid-crystal-cell-fixing pressurizing member 65 is suspended, a liquid crystal cell group 1 can be inserted between the support jigs 30 or the liquid crystal cell group 1 inserted between the support jigs 30 can be removed.

The pair of transparent support jigs 301a and 301b (hereinafter referred merely to as "transparent support jig 301" where there is no need to specify any of these) are plate members structured of a material possessing light transmissive property. These transparent support jigs 301, in any, have a surface 31 opposed to the other transparent support jig 301 (in other words, the surfaces opposite to both outer surfaces of the substrate plates of the liquid crystal cell group 1 to be supported, hereinafter referred to as "planar surfaces") 31. The planar surface 31 is arranged with a closing seal 32. The closing seal 32 is a frame-formed member of an elastic material such as rubber, cooperating with support jig 30 to structure support means 3. As shown in FIG. 2, a part of the same is structured to protrude from a planar surface 31. Also, a polarization plate 33 is bonded on a surface of the planar surface 31 of the transparent support jig 301 in an area surrounded by the closing seal 32. Herein, the polarizing axis of each polarization plate 33 corresponds to a direction of rubbing on both outer surfaces of the substrate plates of the liquid crystal cell group 1 to be supported by the transparent support jig 301.

Meanwhile, the opaque support jigs 302a–302e are (hereinafter, to referred merely as "opaque support jig 302" where there is no need to specify any of these) also in nearly the same structure to the above transparent support jig 301. That is, as shown in FIG. 2, each opaque support jig 302 has a planar surface 31 opposed to another adjacent opaque support jig 302. In the planar surface 31 is arranged a closing seal 32 similar to the transparent support jig 301. It is noted that the opaque support jig 302 is different from the transparent support jig 301 in that it is a plate member having no light transmissive property (e.g. aluminum plate or the like) and the polarization plate 33 is not bonded.

As shown in FIG. 2, the liquid crystal cell groups 1 to be worked by the cell gap adjusting device 2 are supported between a pair of support jigs 30 in a state where the surfaces of the substrates 11, 12 are abutted against the closing seals 32 on the support jigs 30.

Figure 4:
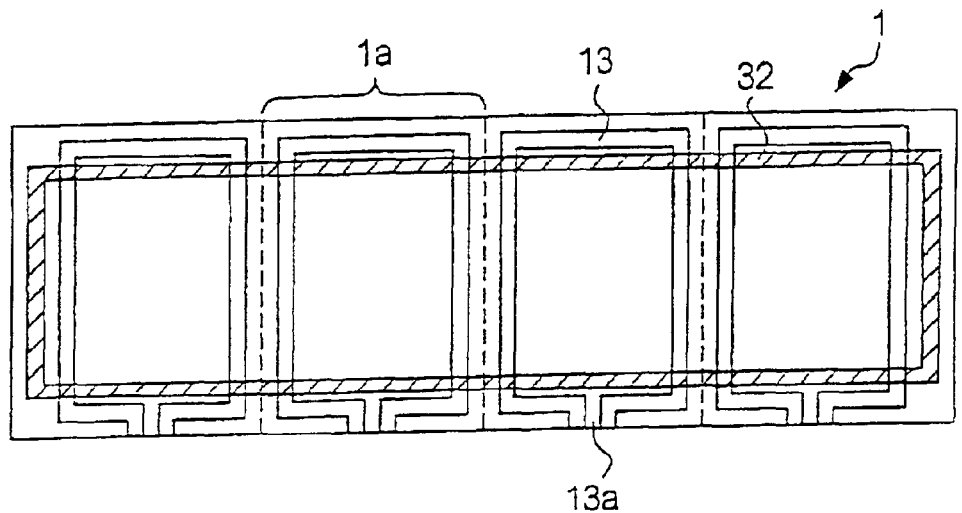
FIG. 4 is a plan view showing a positional relationship between a liquid crystal cell group and a closing seal in a state of attaching to the cell gap adjusting device the liquid crystal cell group used in one embodiment of the cell gap adjusting device of the invention.

FIG. 4 shows a positional relationship between the liquid crystal cell group 1 and the closing seal 32 as viewed from above changed in view point from FIG. 2 showing the state where the liquid crystal cell group 1 is supported by the cell gap adjusting device 2. As shown in FIG. 4, the closing seal 32 in the embodiment abuts against both outer surfaces of the substrate plates of the liquid crystal cell group 1 in a manner surrounding a major part of the four liquid crystal cells 1a continued in an array form structuring the liquid crystal cell group 1. Furthermore, the closing seal 32 is positioned entirely on an inner side of the edge of the substrate 11 or substrate 12 (see FIG. 1(b)). As a result of the liquid crystal cell group 1 supported in this form, the space surrounded by both outer surfaces of the substrate plates of the liquid crystal cell groups 1, the inner surface of the closing seal 32 and the planar surface 31 of the support jig 30 (furthermore polarization plates 33, for the transparent support jigs 301) forms an enclosed space that is enclosed excepting a port connected to a fluid supply pipe 40 (hereinafter, referred to as "pressurized space") (see FIG. 2).

In FIG. 2, the fluid supply pipe 40 is a pipe provided to connect the pressurized spaces with pressurizing means 50. Specifically, the fluid supply pipe 40 is in a form that branches from the pressurizing means 50 to extend to the support jigs 30 wherein it passes from an outer side of the region surrounded by the closing seal 32 of each support jig 30 through an interior of the support jig 30 to reach the inner side of the region surrounded by the closing seal 32 (i.e. pressurized space). It is noted that, in the opaque transparent support jigs 302d, the liquid crystal cell groups 1 are supported on both sides thereof to form pressurized spaces as shown in FIG. 2. Consequently, the fluid supply pipe 40 branches into two parts within the opaque support jig 302d, one of which reaches the pressurized space to be formed on the upper side and the other reaches the pressurized space to be formed on the lower side.

Next, the pressurizing means 50 is a device to supply a fluid (showing an example of air in this embodiment) to each pressurized space through the fluid supply pipe 40. With this structure, air is supplied from the pressurizing means 50 to each pressurized space. Due to this, the pressure of air is applied at one time to the pressurized spaces including both outer surfaces of the substrate plates of each liquid crystal cell group 1. Meanwhile, the pressurizing means 50 is made to adjust the pressure (i.e. pressure to be applied to both outer surfaces of the substrate plates of the liquid crystal cell group 1) to be applied to the pressurized spaces in accordance with a pressure control signal PCS supplied from a PC 80.

Next, a light source 60 is arranged on a side opposite to the side supporting the liquid crystal cell groups 1 on the transparent support jigs 301a. The light source 60 is to illuminate light toward the transparent support jig 301a and supported by a light-source supporting jig 61. Herein, as described in the foregoing, the transparent support jigs 301a and 301b are structured of a material possessing light transmissive property wherein the polarizing axis of each polarization plate 33 bonded on the planer surface 31 of these corresponding to a rubbing direction on each substrate plates of the liquid crystal cell group 1. Accordingly, the light emitted from the light source 60 passes through a route including, in order, the transparent support jig 301a, the polarization plate 33, the pressurized space, the liquid crystal cell group 1, the polarization plate 33, the pressurized space and the transparent support jig 301b and is emitted on a side opposite to the side supporting the liquid crystal cell group 1 of the transparent support jig 301b.

A color CCD camera 70 (light detecting section) receives the light from the light source 60 that is emitted at the transparent support jig 301b to output to the PC 80 an image signal V representative of the light amount of each single-color light of red light (R), green light (G) and blue light (B).

The PC 80 is means to instruct and deliver a pressure to be applied to the pressurized space to the pressurizing means 50. Specifically, the PC 80 detects a cell gap (d) of the liquid crystal cell group 1 (detection cell 1C) supported by the transparent support jig 301 depending upon an image signal V supplied from the color CCD camera 70, and instructs and delivers, with a pressure control signal PCS, a pressure to be applied to the pressurized space to the pressurizing means 50 in order to make the cell gap (d) near a previously set target value (d0).

Figure 5:
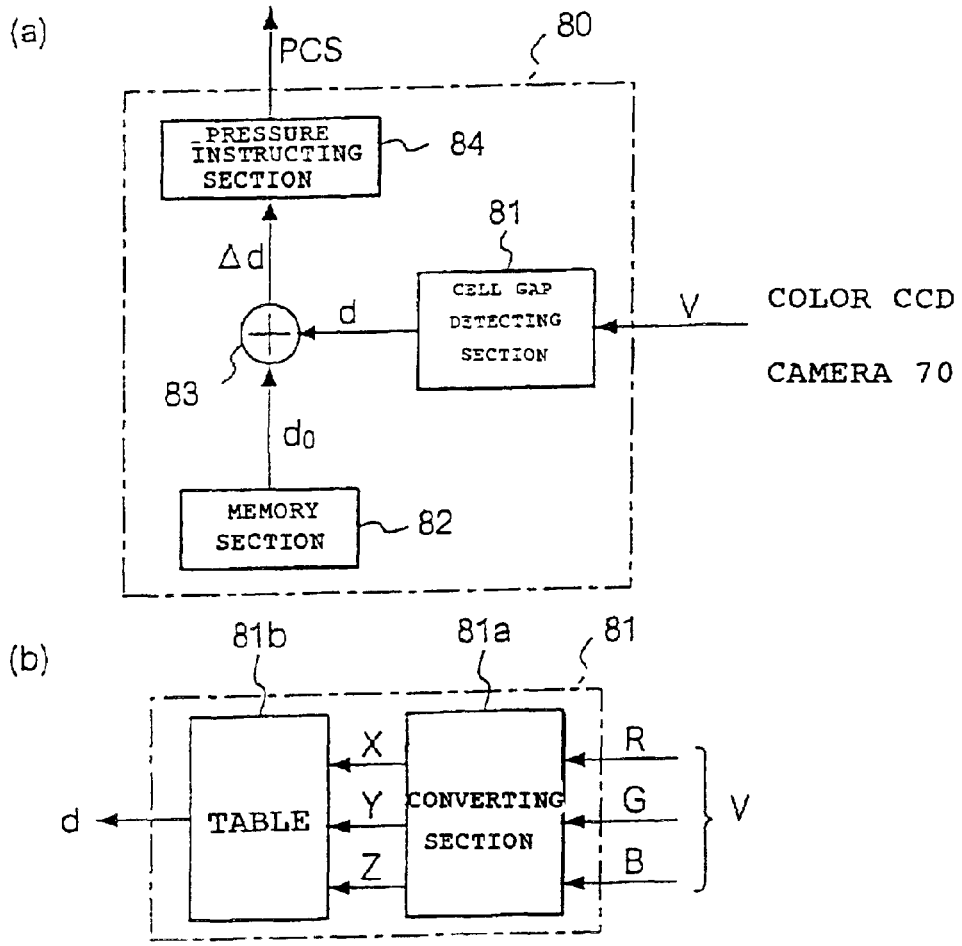
FIG. 5 is a block diagram showing a function of the one embodiment of the cell gap adjusting device of the invention, wherein (a) shows one example of a functional structure for pressure instruction and delivery by a PC and (b) shows one example of a structure of a cell gap detecting section in the PC.

FIG. 5(a) is a block diagram showing one example of a functional structure for pressure instruction by the PC 80. The PC 80 is configured including a cell gap detecting section 81, a memory section 82, an operating section 83 and a pressure instructing section 84.

The cell gap detecting section 81 detects a cell gap (d) of a detection cell 1C in current time on the basis of an image signal V supplied from the color CCD camera 70. Specifically, the cell gap detecting section 81 in this embodiment is structured with a converting section 81a and a table 81b, as shown in FIG. 5(b). The converting section 81a is means to convert the image signal V representative of a light amount of each of single-color light R, G and B into a chromaticity coordinate (X, Y, Z) on a CIE chromaticity diagram. Also, the table 81b is previously set with a corresponding relationship between a chromaticity coordinate on the CIE chromaticity diagram and a cell gap (d) so that, when a chromaticity coordinate is input from the converting section 81a, a corresponding cell gap (d) is output.

In FIG. 5(a), the memory section 82 is stored with a target value (d0). The operating section 83 computes a difference value (Δd) between a current cell gap (d) detected by the cell gap detecting section 81 and a target value (d0) stored in the memory section 82, i.e. (d–d0), and outputs it to the pressure instructing section 84.

The pressure instructing section 84 instructs and delivers, with a pressure control signal PCS, a pressure to be applied to the pressurized space to the pressurizing means 50 in order to make the difference value (Δd) output from the operating section 83 near to "0". Specifically, the pressure instructing section 84, where the difference value (αd) is positive, i.e. where the cell gap (d) is greater than the target value (d0), outputs to the pressurizing means 50 a pressure control signal PCS to instruct and deliver a signal for increasing the pressure. On the contrary, where the difference value (Δd) is negative, i.e. where the cell gap (d) is smaller than the target value (d0), a pressure control signal PCS is output to the pressurizing means 50 to instruct and deliver a signal for decreasing the pressure. In this manner, the pressure applied to the substrate plates 11 and 12 of each liquid crystal cell group 1 (exactly, pressurized space) is adjusted such that the cell gap (d) of each liquid crystal cell group 1 goes near the target value (d0) (see FIG. 1(b)).

B; Detailed Procedure for Working Liquid Crystal Cell Group 1

Next, with reference to FIG. 2, explanation is made on a procedure for working a plurality of liquid crystal cell groups 1 by the use of the cell gap adjusting device 2.

First, a plurality of liquid crystal cell groups 1 to be worked are set in the cell gap adjusting device 2 such that both outer surfaces of each substrate plate abut against the closing seals 32 of a pair of support jigs 30. Specifically, in a state where the pressurizing of the support jigs 30 by the liquid-crystal-cell-fixing pressurizing member 65 is suspended, a liquid crystal cell group 1 to be worked is inserted between the pair of the support jigs 30. Subsequently, each liquid crystal cell group 1 is fixed between the pair of the support jigs 30 by pressurizing the support jigs 30 due to the liquid-crystal-cell-fixing pressurizing member 65.

Thereafter, pressure is applied to both outer surfaces of the substrate plates of the liquid crystal cell group 1 by the pressurizing means 50. On the other hand, the pressure is adjusted under control of the pressurizing means 50 due to the PC 80. Due to this, the cell gap (d) of each liquid crystal cell 1a is made near to the target value (d0) (see FIG. 1).

Specifically, first, the pressurizing means 50 supplies a previously set flow rate of air to the pressurized space. This applies an initial pressure to both outer surfaces of the substrate plates of the liquid crystal cell group 1 in accordance with the flow rate.

Thereafter, under the control of the PC 80, the pressure to be applied to both outer surfaces of the substrate plates of the liquid crystal cell group 1 is adjusted in proper timing in accordance with a cell gap (d) of the detection cell 1C at each point in time under working (i.e. the liquid crystal cell group 1 supported by the transparent support jig 301) (see FIGS. 5(a), (b)). That is, the PC 80 determines a cell gap (d) of the detection cell 1C at a constant time interval on the basis of an image signal V output from the color CCD camera 70, to determine a difference value (αd) between the cell gap (d) and the target value (d0). Then, the PC 80 outputs to the pressurizing means 50 a pressure control signal PCS to instruct and deliver a pressure to be applied to the pressurized space such that the difference value (Δd) nears "0".

Figure 10:
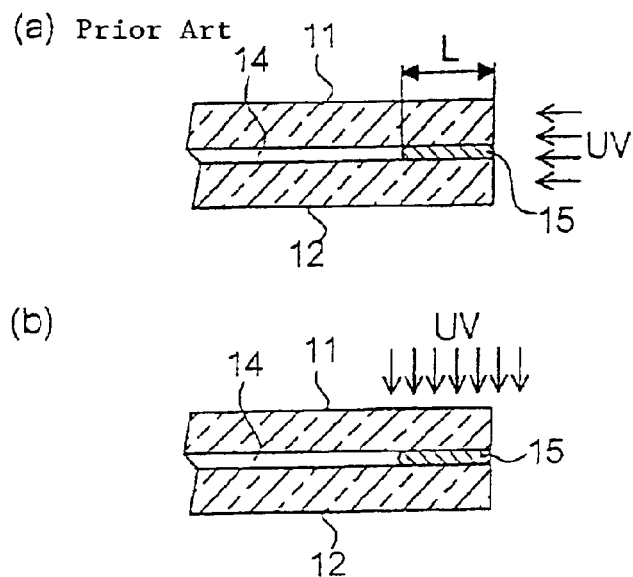
FIG. 10 is a sectional view showing one example of a conventional form of ultraviolet-ray illumination to a seal material.

On condition that, as a result of such control, the cell gap (d) of the detection cell 1C has fully gone near the target value (specifically the cell gap (d) has reached a value in a predetermined range including the target value (d0)) and the cell gap (d) has been kept without variation for a predetermined period, a seal material is applied to close the opening 13a of the seal member 13 of each liquid crystal cell group 1 (see FIG. 1). Incidentally, the present embodiment shows an example using as seal material a resin material having an ultraviolet-cure property (see FIG. 10).

When the application of the seal material is ended, the PC 80 outputs to the pressurizing means 50 a pressure control signal PCS to instruct and deliver a signal for slightly decreasing the pressure applied to both outer surface of the substrate plates of the liquid crystal cell group 1. As a result of weakening the pressure applied to both outer surfaces of the substrate plates in this manner, the seal material applied to the opening 13a flows inside the opening 13a (i.e. to between the pair of substrate plates). By thus structuring, the certainty of sealing can be enhanced greater by curing in a state slightly flowing into one pair of substrate plates than by curing in a state where the sealing material is merely applied to the opening 13a (see FIG. 1).

Next, after outputting the pressure control signal PCS for weakening the pressure to the pressurizing means 50, an ultraviolet ray is illuminated to the sealing material for of a predetermined time. As a result, the sealing material is set to seal the liquid crystal 14 within each liquid crystal cell 1a (see FIG. 1).

The above is the detailed content of the pressurizing seal process according to the embodiment. After the liquid crystal 14 is sealed within each liquid crystal cell 1a, the pressurizing by the liquid-crystal-cell-fixing pressurizing member 65 is suspended to take the liquid crystal cell group 1 out of the cell gap adjusting device 2. Thereafter, each liquid crystal cell group 1 is divided into four liquid crystal cells 1a, to each of which is bonded at both outer surfaces by polarization plates, phase difference plates, etc. and mounted by a drive circuit, etc. for driving the liquid crystal 14 thereby completing a liquid crystal display device (see FIG. 1).

As explained above, the present embodiment applies a fluid pressure to both outer surfaces of the substrate plates of the liquid crystal cell group 1.

Figure 14:
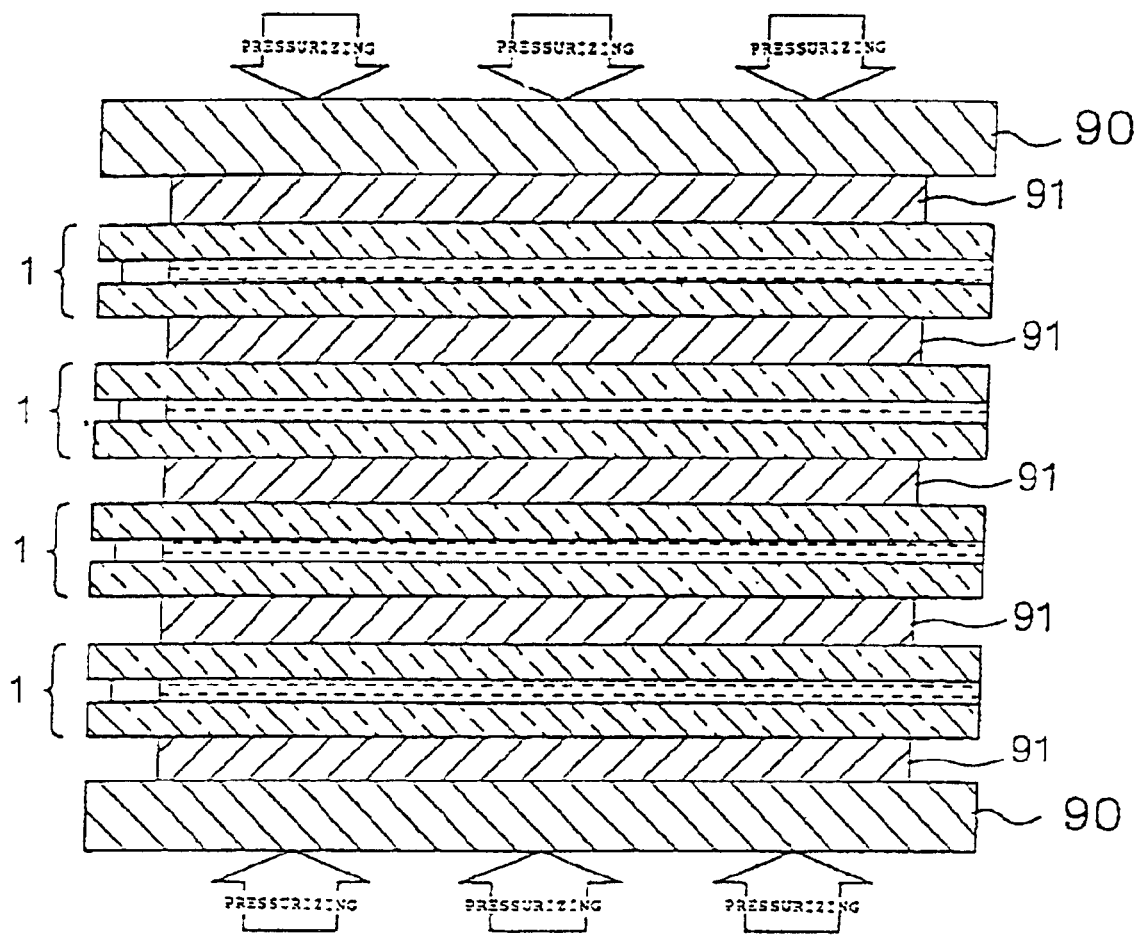
FIG. 14 is a sectional view showing another example of a conventional pressurizing device.

As shown in FIG. 14, where pressurizing is made by contacting interposing papers 91 with both surfaces of the substrate plates, there are cases where even pressurizing is difficult to achieve on both surfaces of the substrate plates due to surface roughening or thickness deviation in the surfaces of the interposing papers 91 or plate-like members 90. Contrary to this, according to the above embodiment, even pressure can be easily applied to the entire portion of both outer surfaces of the substrate plates of the liquid crystal cell groups 1.

Meanwhile, in the conventional method shown in FIG. 14, a certain time is required in fully contracting the interposed papers 91 inserted between the liquid crystal cells. However, because the present embodiment can swiftly apply a fluid pressure to the both outer surfaces of the substrate plates of the liquid crystal cell 1, the cell gap can be rapidly adjusted as compared to the conventional method. Also, because the present embodiment can simultaneously work a plurality of liquid crystal cell groups 1, it is possible to improve productivity as compared to the case of working, one by one, the liquid crystal cell groups 1.

Furthermore, in the present embodiment, a cell gap (d) is detected in any of a plurality of liquid crystal cell groups 1 (detection cell 1C) and on the basis of this cell gap (d) a pressure to be applied to both outer surfaces of the substrate plates of each liquid crystal cell groups 1 is controlled. Accordingly, it is possible to apply a proper pressure to both outer surfaces of the substrate plates in accordance with a situation of the liquid crystal cell groups under work, and correctly adjust the cell gap (d).

Incidentally, it can be considered, with a structure to press the substrate plates by the method shown in FIG. 14, to measure a cell gap (d) by the use of a color CCD camera 70 or the like similar to the above embodiment. In this case, however, there is a need to structure the interposing papers 91 and plate-like members 90 of a material having a light transmissive property. However, there is a restriction that, now that the interposing papers 91 and plate-like members 90 require considerable flatness as described before, they must be structured of a material meeting that requirement, so that, it is not always possible to arbitrarily select a material having a light transmissive property. Contrary to this, in the structure of pressing both outer surfaces of the substrate plates by a fluid pressure as shown in the present embodiment, the pressurized space may be an enclosed space. Consequently, there is a no need to consider the restriction concerning the material of the support jig (transparent support jig 301 in this embodiment) for supporting the liquid crystal cell group 1 that a cell gap is to be detected.

Incidentally, the present embodiment was structured so as to use a closing seal 32 having a rectangular frame form in a sectional form of a frame wall. Such a closing seal 32 can be easily made by removing a center part of a rectangular rubber plate-like member while leaving an edge part. However, if there is no need to consider such a situation, any form of a closing seal 32 may be used.

For example, as shown in FIG. 6(a), a closing seal 32 having a circular frame form in a sectional form of a frame wall may be used. Besides, as shown in FIG. 6(b) to (d), various closing seals 32 may be used that have a frame-wall sectional form of a bell form (shape combined with a semi-circle and a rectangle), an "X" form, "U" form or the like. Briefly, it is satisfactory to sandwich between a planar surface 31 of the support jig 30 and a substrate plate of a liquid crystal cell group 1, and for these gaps to be sealed.

C; Modifications

In the above, although one embodiment of the invention was explained, the above embodiment is a mere exemplification. Various modifications can be applied to the above embodiment within a range not departing from a gist of the invention. The modifications include the following.

In the foregoing embodiment, as shown in FIG. 2, each single-color light of the light emitted from the light source 60 and transmitted through a detection cell 1C was detected in light amount by the color CCD camera 70, to determine a cell gap (d) on the basis of a result of the detection. Herein, for a detection cell 1C without having a color filter, a cell gap (d) can be correctly determined by such a method. However, in the case of using this method in order to determine a cell gap (d) of a detection cell 1C having a color filter, the light received by the color CCD camera 70 is a light transmitted through the color filter. Accordingly, the chromaticity coordinate on a CIE chromaticity diagram varies depending upon a characteristic of the color filter, thus possibly causing a problem that a cell gap (d) cannot be necessarily correctly determined. In order to avoid such a problem, where a detection cell 1C having a color filter is to be worked, the following method is preferably used.

The present modification is provided with a spectrometer in place of the color CCD camera 70 shown in FIG. 2. This spectrometer (light detecting means) is means which receives a transmission light emitted from the light source 60 and transmitted through a detection cell 1C to measure a spectral characteristic representative of a relationship between a wavelength ($\lambda$) and transmissivity (T) of this transmission light (or intensity of the transmission light). Incidentally, the present modification shows the case of using, as a light source 60, one that can emit a visible portion of light without having an emission line spectrum (e.g. a halogen lamp or the like).

Figure 7:
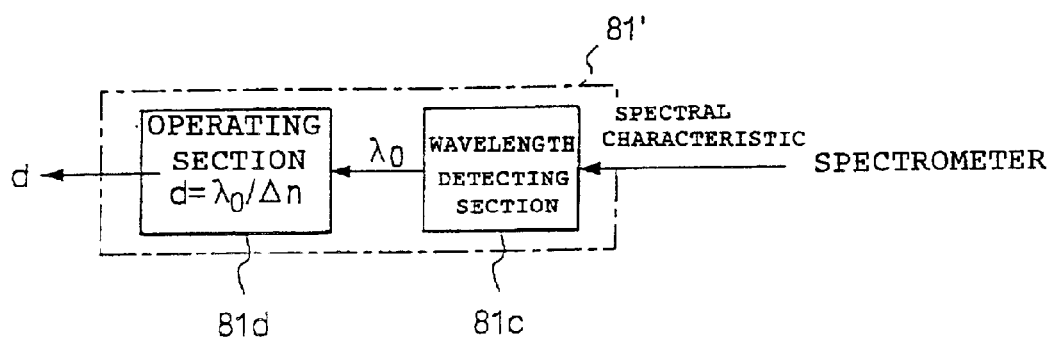
FIG. 7 is a block diagram showing one example of a structure of a cell gap detecting section in one modification of the invention.

This modification shows the case that the cell gap detecting section 81 in the PC 80 shown in FIG. 5(a) is changed from the structure shown in FIG. 5(b) to a structure shown in FIG. 7. That is, the cell gap detecting section 81' in the PC 80 of this modification is structured with a wavelength detecting section 81c and an operating section 81d. Nevertheless, the cell gap detecting section 81' is similar to the cell gap detecting section 81 shown in FIG. 5(b) in that it plays a role to determine a cell gap (d) of a detection cell C.

In such a structure, when the time comes to measure a cell gap during working of a detection cell 1C, the cell gap detecting section 81' in the PC 80 determines a cell gap (d) on the basis of a spectral characteristic measured by a spectrometer. Specifically, this is as follows.

Figure 8:
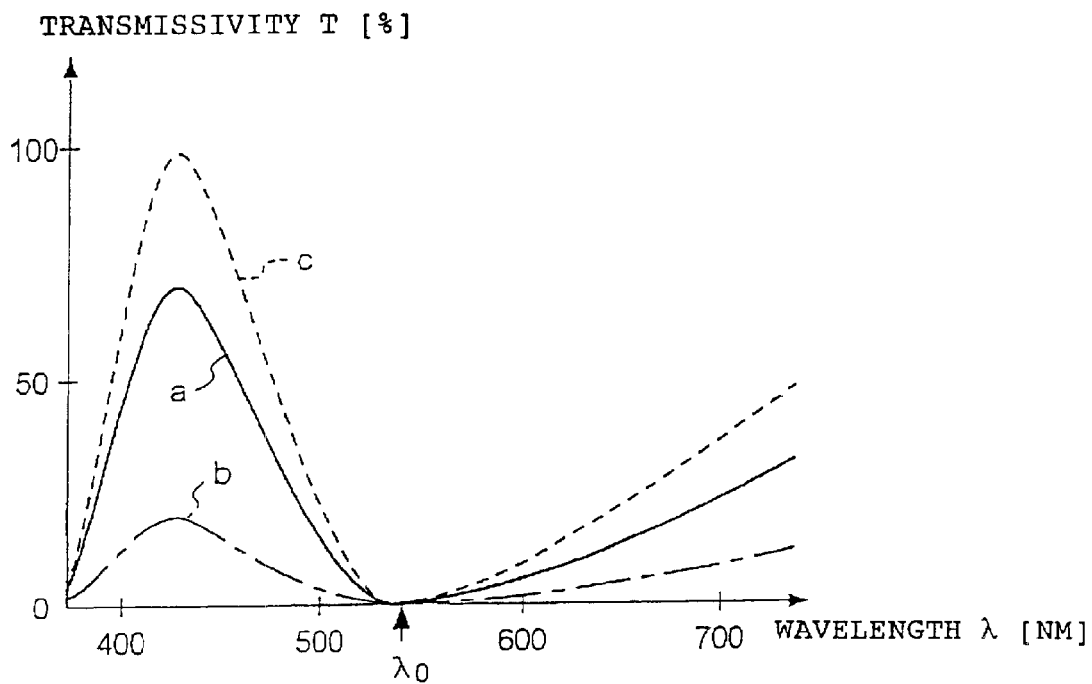
FIG. 8 is a graph showing one example of a spectral characteristic measured by a spectrometer in the modification shown in FIG. 7.

Herein, a characteristic "a" in a graph showing a spectral characteristic in FIG. 8 (relationship between a transmissivity (T) [%] and a wavelength (λ) [nm]) is a graph showing one example of a spectral characteristic measured by a spectrometer where a detection cell 1C having a color filter A is to be worked. As can be understood from the spectral characteristic shown in FIG. 8, there is a wavelength (λ0) having a transmissivity (T) assuming a minimum value in a transmission light through a detection cell 1C. The wavelength detecting section 81c in the cell gap detecting section 81' detects a wavelength (λ0) having a transmissivity (T) assuming a minimum value on the basis of a spectral characteristic outputted from the spectrometer and outputs it to the operating section 81d (see FIG. 7).

On the other hand, the operating section 81d makes an operation of "=dλ0/Δn" by the use of a notified value of a wavelength (λ0) and a previously determined birefringent refractive index (Δn) (difference between a normal-light refractive index $n_e$ and an abnormal-light refractive index $n_O$) thereby detecting a cell gap (d). Herein, the transmissivity (T) becomes a minimum value when the wavelength (λ) equals to Δnd, i.e. λ=Δnd. From this relationship, if a wavelength (λ0) and Δn is found, a cell gap (d) of a liquid crystal cell group 1 being considered can be detected by the operation d=λ0/Δn mentioned above (see FIG. 7).

The operations other than this are similar to the foregoing embodiment. That is, a difference value (Δd) between a cell gap (d) determined by the operating section 81d of the cell gap detecting section 81' and a target value (d0) is determined, and a pressure to make the difference value (Δd) near to "0" is instructed and delivered to the pressurizing means 50 (see FIG. 7).

Herein, a characteristic "b" in a graph showing a spectral characteristic in FIG. 8 (relationship between a transmissivity (T) [%] and a wavelength (λ) [nm]) shows a spectral characteristic measured in a case where a detection cell 1C having a color filter B different in characteristic from the above color filter A is to be worked. A characteristic "c" in the graph of FIG. 8 shows a spectral characteristic measured in a case where a detection cell 1C without having a color filter is to be worked. As can be understood from these figures, the wavelength (λ0) at which the transmissivity (T) assumes a minimum value is the same value regardless of the difference in color filter characteristic and the presence or absence of a color filter. Accordingly, if the method according to this modification is used, a cell gap (d) can be correctly measured without any effect of the color filter characteristic. Incidentally, although the above example detects a wavelength (λ0) at which the transmissivity (T) assumes a minimum value, it is satisfactory in place thereof to detect a wavelength (λ0') at which the transmissivity (T) assumes a maximum value (not shown) thereby determining a cell gap (d) on the basis thereof.

Nevertheless, the cell gap detecting method shown in the foregoing embodiment and this modification is a mere exemplification. It is possible to use other various methods without being limited to the method. For example, it is possible to use a method for determining a cell gap (d) of a detection cell from a difference between a volume of the detection cell prior to working and a volume in the detection cell after flowing out of a liquid crystal due to pressing at both outer surface of the substrate plates (to be determined from an amount of liquid crystal flowing out).

Figure 6:
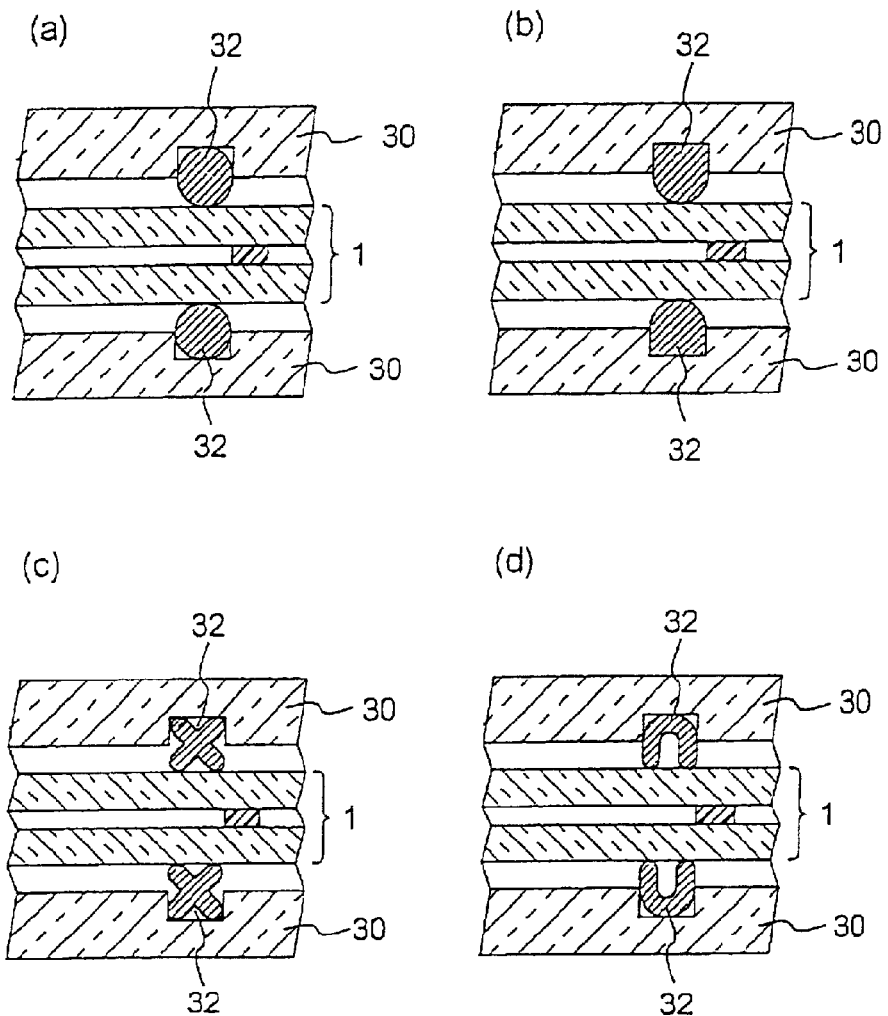
FIG. 6 is a sectional view showing another example of a closing seal used in the one embodiment of the cell gap adjusting device of the invention.

Although the foregoing embodiment assumed the case that the substrate plate surfaces of the liquid crystal cell group 1 and the closing seal 32 are in a relationship shown in FIG. 6, the positional relationship is not limited to this but may be given as the following.

Figure 9:
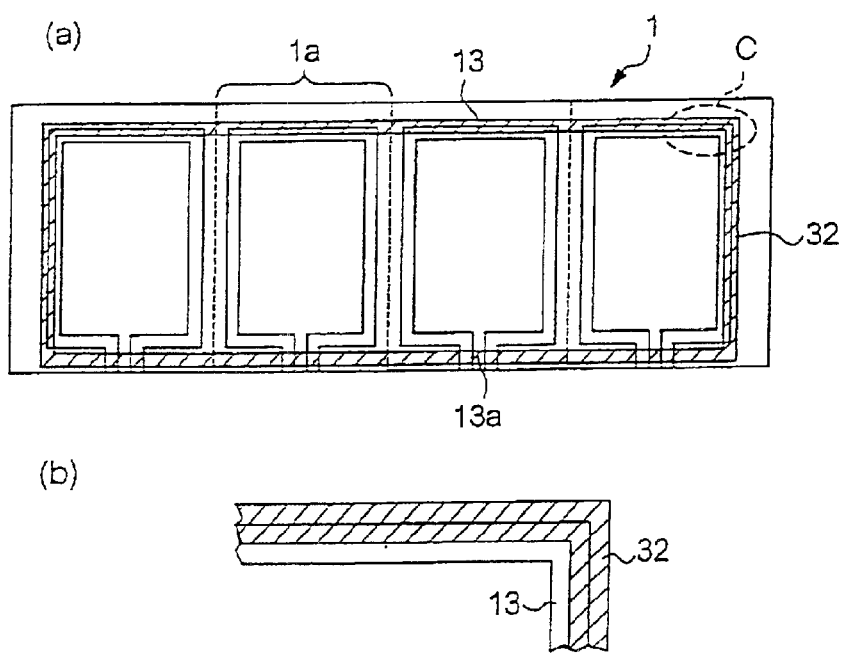
FIG. 9 is a plan view showing a positional relationship between a liquid crystal cell group and a closing seal in another modification of the invention.

FIG. 9(a) is a plan view showing a relationship between the liquid crystal cell group 1 and the closing seal 32 in a case where in the present modification the liquid crystal cell group 1 in a state supported by the cell gap adjusting device 2 is viewed in a vertical direction to a substrate plate surface of the liquid crystal cell group 1. Meanwhile, FIG. 9(b) is a magnified view of a region C surrounded by a broken line in FIG. 9(a). As shown in FIG. 9, in this modification at least one part of the closing seal 32 as viewed in a vertical direction with respect to the substrate surface of the liquid crystal cell group 1 overlaps with each seal member 13 of the liquid crystal cell group 1. Incidentally, the closing seal 32 in its entire form is positioned inward of the edge of the substrates of the liquid crystal cell group 1, similarly to the foregoing embodiment.

In the meanwhile, where seal material applied to a vicinity of the opening 13a of the seal member 13 and drawn between the pair of substrate plates is cured due to illumination with an ultraviolet ray (see FIG. 9), it is a conventional practice to illuminate an ultraviolet ray (UV) in a direction parallel with the substrate plate surface to the seal material 15 drawn between the pair of substrate plates as shown in FIG. 10(a). In this case, the seal material 15 is gradually cured in a direction of from a proximal side toward a distal side of an ultraviolet-ray illumination device (i.e. in a direction of from right to left in FIG. 10(a)). However, the length L of the seal material 15 in a UV-ray illuminating direction is long as compared to the length in a vertical direction thereto. Due to this, a considerable time is required to completely cure the entire seal material 15 (to cure the extreme left portion of the seal material 15 shown in FIG. 10(a)).

In view of that circumstance, it is preferred to illuminate an ultraviolet-ray to the seal material 15 in a direction vertical to the substrate plate surface as shown in FIG. 10(b). That is, by doing so, the length of the seal material 15 in an ultraviolet-ray illuminating direction (corresponding to the cell gap) is conspicuously shortened as compared to the foregoing conventional technique. As a result, where adopting an ultraviolet-ray illuminating method shown in FIG. 10(b), it is possible to conspicuously shorten the time required for completely hardening the entire seal material 15 as compared to the conventional method of illuminating an ultraviolet ray in a direction parallel with the substrate plate surface.

Figure 11:
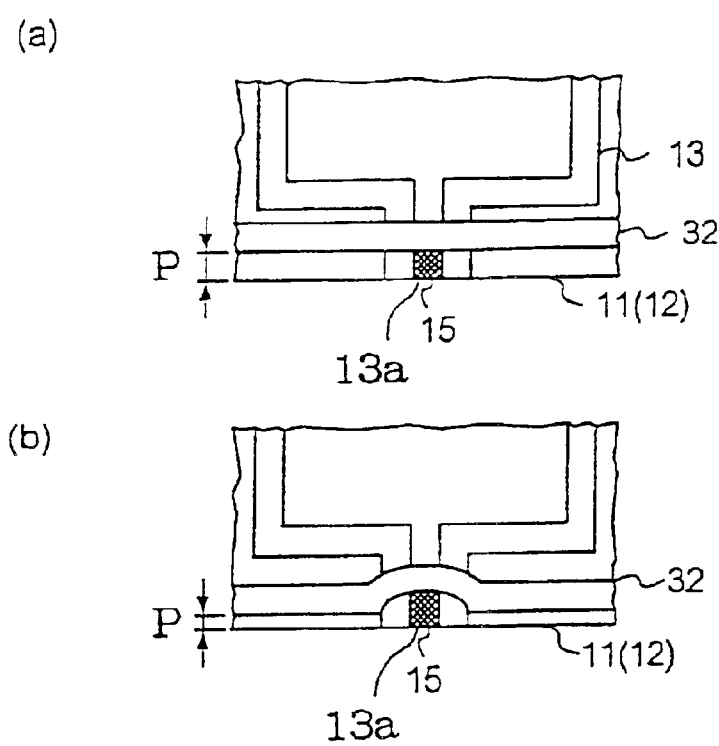
FIG. 11 is a plan view showing one example of a structure in a vicinity of an opening and closing seal of a liquid crystal cell group in the modification shown in FIG. 9.

Herein, in the case where the structure shown in FIG. 10(b) is adopted in the present modification, it is preferred to provide a comparatively long distance P as shown in FIG. 11(a), i.e. distance P between an edge of substrate 11 or 12 and a closing seal 32 in order to fully illuminate an ultraviolet ray to the seal material 15. If this distance P is short, the ultraviolet ray is shaded by the closing seal 32. As a result, it is difficult to fully illuminate an ultraviolet ray to the seal material 15 drawn between the pair of substrate plates. There encounters a case that the seal material 15 cannot be fully hardened.

According to the test by the present inventor, a result has been obtained that, if the distance P is 1 mm or greater, the seal material 15 can be fully cured. Accordingly, it is preferred to provide a distance P between an edge of substrate 11 or 12 of a liquid crystal cell group 1 and a closing seal 32 of 1 mm or greater (see FIG. 1).

Nevertheless, there is possibly a case that the distance P is difficult to secure at 1 mm or greater due to the relationship with the structure of a liquid crystal cell group 1. In such a case, it is preferred, as shown in FIG. 11(b), to provide a recess form having a recess in a direction away from an opening 13a, in a vicinity of the opening 13a of the seal member 13 on the closing seal 32. In other words, it is preferred to provide such a form as avoiding a region where the seal material 15 has been drawn, in the closing seal 32 at a portion in the vicinity of the opening 13a. This structure can reduce the UV-ray-shading portion in the closing seal 32 (in other words, the portion of the seal material 15 to be illuminated by a ultraviolet ray can be increased), thereby making it possible to fully illuminate a ultraviolet ray to the seal material 15 and positively cure it.

The foregoing embodiment and modifications showed the case that the closing seal surrounds a greater part of the substrate plate surface of the liquid crystal cell group. However, where using a closing seal surrounding a part of the substrate plate surface of the liquid crystal cell group, a common closing seal (i.e. common cell gap adjusting device) can be used to work a plurality of kinds of liquid crystal cell groups different in substrate plate size. Incidentally, in the following explanations concerning the above, where a plurality of kinds of liquid crystal cell groups 1 different in substrate plate size are to be worked, among them a liquid crystal cell group 1 greatest in substrate plate area is denoted as "liquid crystal cell group 1A" and a liquid crystal cell group 1 smallest in substrate plate area is denoted as "liquid crystal cell group 1B".

Figure 12:
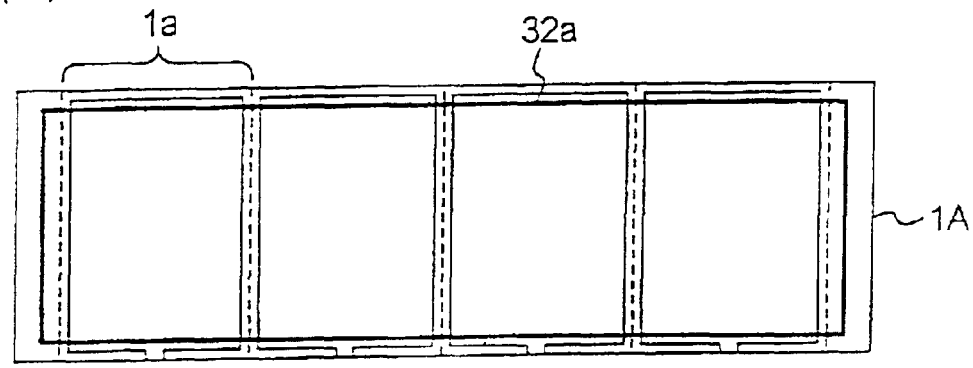
FIG. 12 is a plan view for explaining still another modification of the invention and its effect.
Figure 12:
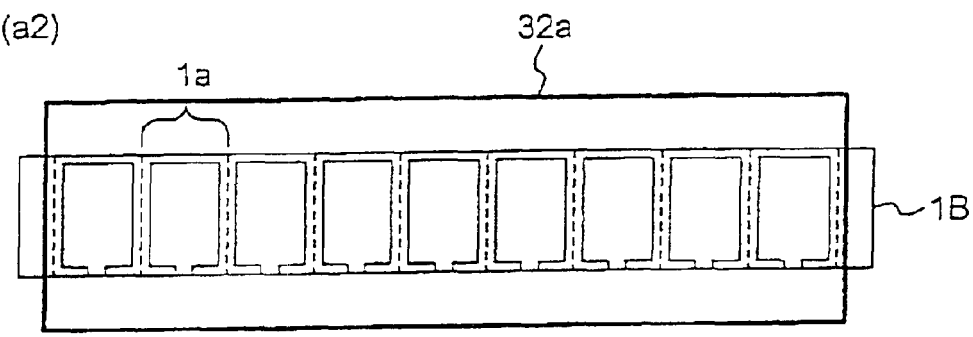
Figure 12:
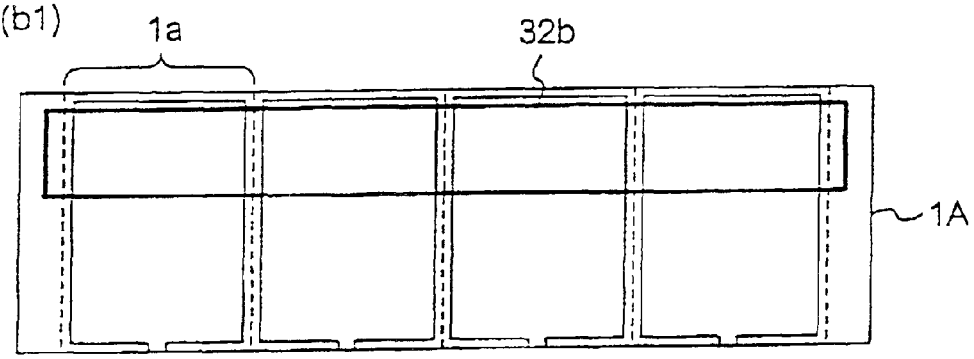
Figure 12:
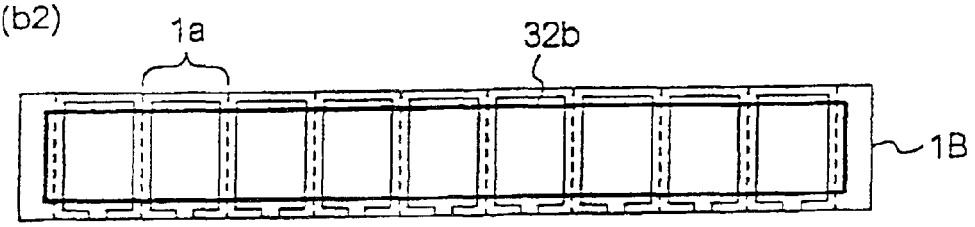
Figure 13:
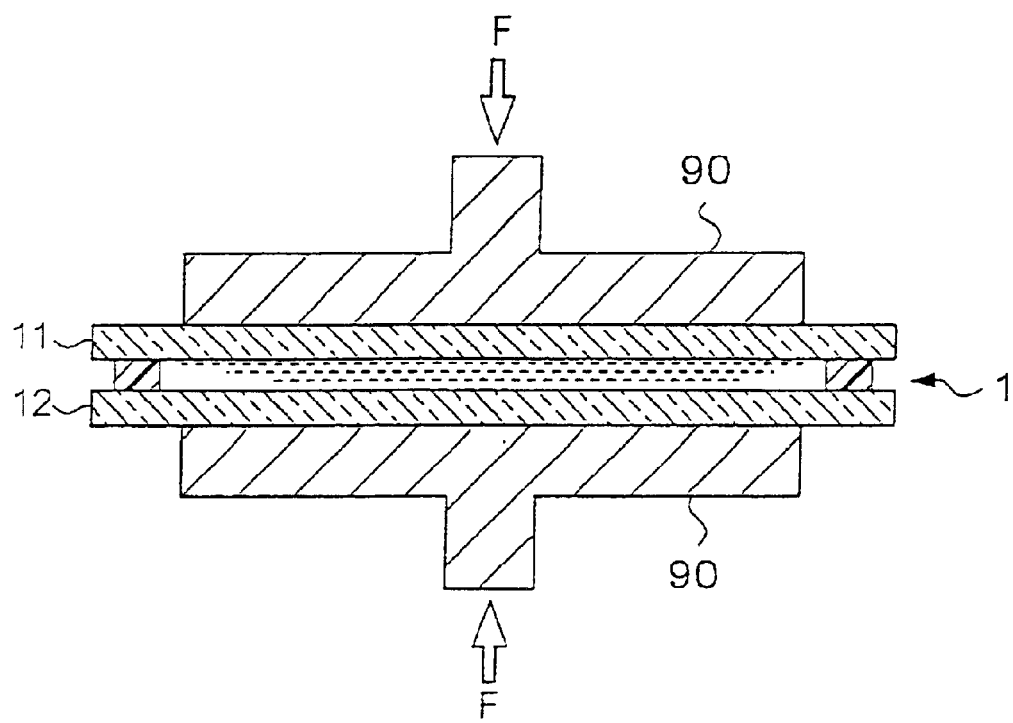
FIG. 13 is a sectional view showing one example of a conventional pressurizing device.

In the case that in order for a liquid crystal cell group 1A greatest in substrate plate area being worked where using a closing seal 32a surrounding a greater part of the substrate plates as shown in FIG. 12(a1), the closing seal 32a can press the entire substrate-plate of the liquid crystal cell group 1A (specifically, the area surrounded by the closing seal 32a). Accordingly, this is well suited in use for working the liquid crystal cell group 1. However, where working a liquid crystal cell group 1B smaller in area than that as shown in FIG. 12(a2), this closing seal 32a cannot be used. That is, the closing seal 32a has an area not abutted against the substrate surface of the liquid crystal cell group 1B, making it impossible to form an enclosed pressurized space.

Contrary to this, in the case of using a closing seal 32b surrounding a part of the substrate plate of the liquid crystal cell group 1A as shown in FIG. 12(b1), it is impossible to exert pressure on the entire substrate surface of the liquid crystal cell group 1a. However, by exerting pressure on part of the substrate plates (i.e. the area surrounded by the closing seal 32b), it is possible to flow out an extra portion of the liquid crystal 14 in each liquid crystal cell 1a (see FIG. 1(b)) thereby adjusting the cell gap (d) to a target value (d0). Also, where working a liquid crystal cell group 1B smaller in substrate plate area than the liquid crystal cell group 1A as shown in FIG. 12(b2), the closing seal 32b in its entirety can be abutted against the substrate plate surface of the liquid crystal cell group 1B to form an enclosed pressurized space. In this manner, a common closing seal 32b can be used in working both the liquid crystal cell groups 1A and 1B different in substrate plate size.

As described above, where a plurality of liquid crystal cell groups 1 mutually different in substrate plate area are to be worked, the closing seal may be selected in size, shape and the like such that one closing seal in its entire form is abutted against all the liquid-crystal-cell-group substrate plates (in other words, such that an enclosed pressurized space is formed for every liquid crystal cell group by the use of a common closing seal). This can work a plurality of kinds of liquid crystal cell groups 1 by using a cell gap adjusting device 2 having a closing seal 32 in one kind. That is, there is no need to prepare a cell gap adjusting device 2 having a closing seal 32 suited for each of a plurality of kinds of liquid crystal cell groups to be worked or to replace a closing seal 32 provided by the cell gap adjusting device 2 each time of working a different liquid crystal cell group 1, thus improving productivity. Incidentally, the cell gap adjusting device 2 is structured for simultaneously working a plurality of liquid crystal cell groups 1. Consequently, in the case of structuring a closing seal 32 for common use to a plurality of kinds of liquid crystal cell groups 1, the same kind of liquid crystal cell groups 1 can be naturally worked and moreover a plurality of kinds of liquid crystal cell groups 1 different in substrate plate size can be simultaneously worked.

In the meanwhile, in order to commonly use one closing seal 32 in working the increased kinds of liquid crystal cell groups 1, the area encompassed by the closing seal 32 (hereinafter, referred to as "encompassed area") is preferably as small as possible in order to cope with a liquid crystal cell group particularly small in substrate plate area. However, where such a closing seal 32 small in encompassed area is used in a liquid crystal cell group 1 having a substrate plate comparatively large in area, the pressurized space is narrowed. As a result, there possibly occurs a case that the substrate plates cannot be applied by a pressure sufficient for flowing an extra portion of liquid crystal 14 out of each liquid crystal cell 1a (see FIG. 1(b)).

As a result of the experiment by the present inventor, it has been found that, for a substrate plate of each liquid crystal cell 1a structuring a liquid crystal cell group 1, the pressing on an encompassed area having approximately one-third of an area thereof is satisfactory for flowing an extra portion of liquid crystal 14 out of the liquid crystal cell 1a. Accordingly, it is preferred to select a size, shape and the like of a closing seal 32 such that the encompassed region of the closing seal 32 has an area at least one-third or greater of a substrate plate area of each liquid crystal cell 1a structuring all the liquid crystal cell groups 1 to be worked (see FIG. 1(b)).

Although the foregoing embodiment showed the case that the entire support jig 30 (i.e. transparent support jig 301) for supporting a to-be-worked liquid crystal cell group 1 (detection cell 1C) on which a cell gap is to be detected is structured of a material having a light transmissive property, this is not the only case but rather the support jig 30 may be structured in part of a material having a light transmissive property. For example, only a part of the transparent support jig 301a may be structured of a member having a light transmissive property such that the light emitted from the light source 60 is illuminated to at least a part of a to-be-worked liquid crystal cell group 1, and further only a part of the transparent support jig 301b be structured of a member having a light transmissive property such that part of the light transmitted through the detection cell 1C is emitted toward the color CCD camera 70. Briefly, it is satisfactory to have a structure that at least one part of the light emitted from the light source 60 transmits through the detection cell 1C to reach the color CCD camera 70 (see FIG. 2).

Although the foregoing embodiment showed the case that cell gap measurement of a detection cell 1C and pressure control on the basis thereof were made each time a liquid crystal cell group 1 was worked, such a process may be made upon any working. That is, cell gap measurement and pressure control on the basis thereof are made only upon working four liquid crystal cell groups 1 on which cell gap adjustment is first to be made. Then, an averaged pressurizing condition is statistically determined from the pressurizing conditions of working these liquid crystal cell groups 1. On the other hand, upon working liquid crystal cell groups 1 in and after the next time, working may be made under the averaged pressurizing condition. That is, cell gap measurement and pressure control on the basis thereof are not necessarily required each time working is made by the cell gap adjusting device 2 of the present embodiment.

Although the foregoing embodiment and modifications showed the case that a liquid crystal cell group 1 having a plurality of liquid crystal cells 1a in an array is to be worked, application is possible for a case of carrying out pressurizing seal on each of a plurality of liquid crystal cells 1 a obtained by dividing such a liquid crystal cell group 1. That is, the foregoing "liquid crystal cell" means a concept including both "individual liquid crystal cell" and "each liquid crystal cell group 1 structured with a plurality of liquid crystal cells 1a" (see FIG. 1).

Meanwhile, although the foregoing embodiment showed the cell gap adjusting device 2 capable of simultaneously working four liquid crystal cell groups 1, the number of liquid crystal cell groups 1 to be simultaneously worked is not limited to that.

As explained above, the present invention can provide a cell gap adjusting device, pressurizing seal device and liquid crystal display manufacturing method for correctly and swiftly adjusting the cell gaps of one or more liquid crystal cells. The entire disclosures of Japanese Patent Application Nos. 2000-271565 filed Sep. 7, 2000, 2000-284167 filed Sep. 19, 2000, and 2001-212081 filed Jul. 12, 2001 are incorporated herein by reference.

What is claimed is:

1. A cell gap adjusting device for adjusting a thickness between pairs of substrate plates in liquid crystal cells having liquid crystal filled between the pairs of substrate plates bonded together through a seal member having a frame form and an opening in a predetermined point of a frame wall thereof, the cell gap adjusting device comprising:

supporting means having at least two pairs of supporting jigs for clamping to support at least two of the liquid crystal cells and closing seals in a frame form arranged between the liquid crystal cell and the supporting jigs to form an enclosed space by both outer surfaces of the one pair of substrate plates of the liquid crystal cell, opposed surfaces of the one pair of support jigs to the liquid crystal cell and an inner surface of the closing seals, the at least two pairs of supporting jigs including at least one light transmissive supporting jig supporting one of the liquid crystal cells;

a lamp operable to irradiate the light transmissive supporting jig with light;

pressurizing means for simultaneously pressurizing both outer surfaces of each of the pairs of substrate plates of the liquid crystal cell by a fluid introduced in each enclosed space based on a pressure signal; and control means for detecting a cell gap of the one of the liquid crystal cells based on light from the lamp transmitted through the light transmissive supporting jig which supports the one of the liquid crystal cells, calculating a pressure for pressurizing both outer surfaces of each of the pairs of substrate plates of each liquid crystal cell on the basis of the detected cell gap and generating and delivering the pressure signal to the pressurizing means.

2. A cell gap adjusting device as claimed in claim 1, wherein the liquid crystal cell is a liquid crystal cell group structured by filling a liquid crystal in a plurality of cells formed by bonding the one pair of substrate plates through a plurality of seal materials in frame forms in plane without overlapping with one another.

3. A cell gap adjusting device as claimed in claim 1, further comprising a light source arranged opposite to a surface opposed to the detected cell of one detecting support jig of one pair of support jigs clamping to support the detected cell, the control means having a light detecting section arranged outward of a side of the other detecting support jig to detect a transmission light emitted from the light source and passed through the detected cell, a cell gap detecting section for detecting a cell gap on the basis of a result of detection by the light detecting section, and a pressure instructing section for comparing a detected cell gap and a target value to instruct and deliver to the pressurizing means a signal concerning a pressure for pressurizing both outer surfaces of the one pair of substrate plates of the liquid crystal cell.

4. A cell gap adjusting device as claimed in claim 3, wherein the pressure instructing section instructs and delivers a signal for increasing the pressure to the pressurizing means where the cell gap is greater than a target value and instructs and delivers a signal for decreasing the pressure to the pressurizing means where the cell gap is smaller than the target value.

5. A cell gap adjusting device as claimed in claim 3, wherein the cell gap detecting section detects the cell gap on the basis of a chromaticity coordinate of the transmission light detected by the light detecting section.

6. A cell gap adjusting device as claimed in claim 3, wherein the cell gap detecting section detects the cell gap on the basis of a spectral characteristic of the transmission light detected by the light detecting section.

7. A cell gap adjusting device as claimed in claim 6, wherein the cell gap detecting section detects a wavelength of the transmission light assuming one of a minimum value and a maximum value in transmissivity of the transmission light to make a predetermined operation using the wavelength.

8. A cell gap adjusting device as claimed in claim 3, wherein the detecting support jig has at least one part formed of a material having a light transmissive property in a surface opposed to the outer surface of the substrate plate of the detected cell.

9. A cell gap adjusting device as claimed in claim 1, wherein the one or more pairs of support jigs are structured by one or more pairs of plate-like members stacked on one another with spacing therebetween, to clamp and support the liquid crystal cells between the one or more pairs of plate-like members.

10. A cell gap adjusting device as claimed in claim 9, further comprising a liquid crystal cell fixing pressurizing member structured by an elastic member in a bag form arranged between mutually opposed outer surfaces of the plate-like members directly adjacent the one or more pairs of plate-like members to enable a fluid to be supplied to an interior of the liquid crystal cell fixing pressurizing member, to enable pressurizing of the mutually opposed outer surfaces of the adjacent plate-like members by a fluid.

11. A cell gap adjusting device as claimed in claim 9, wherein the detected cell is a liquid crystal cell clamped and supported by one pair of the plate-like members positioned at ends among one or more pairs of the plate-like members stacked on one another with spacing.

12. A cell gap adjusting device as claimed in claim 1, wherein the closing seal has a portion overlapped with the seal member as viewed in a direction nearly vertical to the surfaces of the one pair of substrate plates.

13. A cell gap adjusting device as claimed in claim 1, wherein a distance from an edge of the substrate plate of the liquid crystal cell in a vicinity of an opening of the seal member to the closing seal is 1 mm or greater.

14. A cell gap adjusting device as claimed in claim 1, wherein the closing seal in a part in the vicinity of the opening of the seal member has a recess formed in a direction away from the opening.

15. A cell gap adjusting device as claimed in claim 1, wherein an enclosed space is formed by opposed surfaces of the one pair of support jigs to the liquid crystal cell, an inner surface of the closing seal and one region of both outer surfaces of the substrate plates of the liquid crystal cell surrounded by the closing seal.

16. A cell gap adjusting device as claimed in claim 15, wherein the one region of the substrate plate surfaces of the liquid crystal cell surrounded by the closing seal has an area of one-third or greater of an area of the substrate plate surface.

17. A cell gap adjusting device as claimed in claim 1, wherein two or more pairs of the support jigs support one or more liquid crystal cells mutually different in substrate plate size, and the closing seal is in contact with the substrate plate surfaces structuring all the liquid crystal cells supported by one or more pairs of support jigs.

18. A manufacturing method for a liquid crystal display device having a liquid crystal filling process of filling a liquid crystal between one pair of substrate plates bonded together through a seal member having a frame form and an opening in a predetermined point of a frame wall thereof thereby forming a liquid crystal cell, a cell gap adjusting process of adjusting a cell gap of the liquid crystal cell, and a seal process of sealing the opening in the seal member in a stage where the cell gap of the liquid crystal cell becomes nearly the same as a target value, wherein
 the cell gap adjusting process includes supporting at least two liquid crystal cells by at least two pairs of support jigs, the at least two pairs of supporting jigs including at least one light transmissive supporting jig supporting one of the liquid crystal cells, the manufacturing method for a liquid crystal display device comprising:
 forming an enclosed space by an inner surface of a closing seal provided between each liquid crystal cell and each support jig, both outer surfaces of one pair of substrate plates of each liquid crystal cell, and opposed surfaces of each support jig to the liquid crystal cell;
 introducing a fluid into the enclosed space and simultaneously pressurizing both outer surfaces of each substrate plate of each liquid crystal cell by an introduced fluid;
 irradiating light through the transmissive supporting jig;
 detecting a cell gap of one of the liquid crystal cells based on light transmitted through the light transmissive supporting jig; and
 calculating a pressure for pressurizing both outer surfaces of each of the pairs of substrate plates of each liquid crystal cell on the basis of the detected cell gap.

19. A cell gap adjusting device for adjusting a thickness between pairs of substrate plates in liquid crystal cells having liquid crystal filled between the pairs of substrate plates bonded together through a seal member having a frame form and an opening in a predetermined point of a frame wall thereof, the cell gap adjusting device comprising:
 at least two pairs of supporting jigs for clamping to support at least two of the liquid crystal cells and closing seals in a frame form arranged between the liquid crystal cell and the supporting jigs to form an enclosed space by both outer surfaces of the one pair of substrate plates of the liquid crystal cell, opposed surfaces of the one pair of support jigs to the liquid crystal cell and an inner surface of the seal member, the at least two pairs of supporting jigs including at least one light transmissive supporting jig supporting one of the liquid crystal cells;
 a pressurized fluid introduced in each enclosed space based on a pressure signal for simultaneously pressurizing both outer surfaces of each of the pairs of substrate plates of the liquid crystal cell;
 a lamp operable to irradiate the light transmissive supporting jig with light; and
 a controller for detecting a cell gap of one of the liquid crystal cells based on light from the lamp transmitted through the light transmissive supporting jig which supports the one of the liquid crystal cells, calculating a pressure for pressurizing both outer surfaces of each of the pairs of substrate plates of each liquid crystal cell on the basis of the detected cell gap and generating and delivering the pressure signal to adjust the pressure of the fluid.

20. A cell gap adjusting device for adjusting a thickness between a pair of substrate plates in a liquid crystal cell having a liquid crystal filled between the pair of substrate plates, which are bonded together through a seal member having an opening in a predetermined point, the cell gap adjusting device comprising:
 a supporting unit that has at least two pairs of supporting jigs and closing seals, each pair of supporting jigs being for clamping to support a corresponding liquid crystal cell, the closing seals being arranged between each liquid crystal cell and the corresponding pair of supporting jigs to form an enclosed space by both outer surfaces of the pair of substrate plates of the liquid crystal cell, opposed surfaces of the corresponding pair of support jigs to the liquid crystal cell, and an inner surface of the closing seals, the at least two pairs of supporting jigs including at least one light transmissive supporting jig supporting one of the liquid crystal cells;
 a lamp operable to irradiate the light transmissive supporting jig with light;
 a control unit that detects a cell gap of the one of the liquid crystal cells based on light from the lamp transmitted through the light transmissive supporting jig which supports the one of the liquid crystal cells, calculates a pressure for pressurizing both outer surfaces of each of the pairs of substrate plates of the liquid crystal cells on the basis of the detected cell gap, and generates and outputs a pressure signal accordingly; and
 a pressurizing unit that receives the pressure signal from the control unit and that, based on the pressure signal, pressurizes both outer surfaces of each of the pairs of substrate plates of all the liquid crystal cells by a fluid introduced in each enclosed space.

21. A cell gap adjusting device for adjusting a thickness between pairs of substrate plates in liquid crystal cells having liquid crystal filled between each pair of substrate plates bonded together through a seal member having a frame form and an opening in a predetermined point of a frame wall thereof, the cell gap adjusting device comprising:
 a supporting unit having:
  at least two pairs of supporting jigs, each pair of supporting jigs clamping to support a liquid crystal cell therebetween;

closing seals interposed between each liquid crystal cell and corresponding supporting jig to form an enclosed space by both outer surfaces of each pair of substrate plates of each liquid crystal cell, opposed surfaces of each corresponding supporting jig, and an inner surface of corresponding closing seals, the closing seals being capable of forming the enclosed space with substrate plates of liquid crystal cells having a plurality of mutually different substrate plate sizes; and a pressurizing unit that simultaneously pressurizes both outer surfaces of the substrate plates of each liquid crystal cell by a fluid introduced in the enclosed space.

* * * * *

UNITED STATES PATENT AND TRADEMARK OFFICE
CERTIFICATE OF CORRECTION

PATENT NO.     : 6,914,661 B2
DATED          : July 5, 2005
INVENTOR(S)    : Kenji Masuda and Masahiro Kurolwa It is certified that error appears in the above-identified patent and that said Letters Patent is hereby corrected as shown below:

Column 14,
Line 60, "C." should be -- 1C. --.

Column 15,
Line 14, " "=dλ0/Δn" " should be -- "d=λ0/Δn" --.

Signed and Sealed this

Sixth Day of June, 2006

JON W. DUDAS
*Director of the United States Patent and Trademark Office*